US012595699B2

(12) United States Patent
Jun et al.

(10) Patent No.: US 12,595,699 B2
(45) Date of Patent: Apr. 7, 2026

(54) VEHICLE INCLUDING A CAP THAT IS AUTOMATICALLY SEPARATED FROM A VEHICLE BODY

(71) Applicants: HYUNDAI MOTOR COMPANY, Seoul (KR); KIA CORPORATION, Seoul (KR)

(72) Inventors: JongChan Jun, Hwaseong-si (KR); Dea Ki Cheong, Yongin-si (KR); Deok Hwan Seo, Incheon (KR); Kwon Hyoung Choi, Suwon-si (KR); Jinhyung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 107 days.

(21) Appl. No.: 18/595,739

(22) Filed: Mar. 5, 2024

(65) Prior Publication Data

US 2025/0075555 A1     Mar. 6, 2025

Related U.S. Application Data

(62) Division of application No. 16/655,830, filed on Oct. 17, 2019, now Pat. No. 11,952,822.

(30) Foreign Application Priority Data

Dec. 14, 2018     (KR) ........................ 10-2018-0161569

(51) Int. Cl.
| *E05F 15/73* | (2015.01) |
| *B60K 15/05* | (2006.01) |
(Continued)

(52) U.S. Cl.
CPC .............. *E05F 15/73* (2015.01); *B60K 15/05* (2013.01); *B60L 53/16* (2019.02); *B60L 53/305* (2019.02);
(Continued)

(58) Field of Classification Search
CPC .... E05F 15/73; E05F 2015/767; B60K 15/05; B60K 2015/0515; B60K 2015/0538;
(Continued)

(56) References Cited

U.S. PATENT DOCUMENTS

| 2004/0227817 A1 | 11/2004 | Oya et al. | |
| 2009/0079225 A1* | 3/2009 | Katou ..................... | E05B 77/48 |
| | | | 701/49 |
| 2015/0183316 A1 | 7/2015 | Wakamatsu et al. | |

FOREIGN PATENT DOCUMENTS

| CN | 203213865 U | 9/2013 |
| CN | 106541821 A | 3/2017 |
(Continued)

OTHER PUBLICATIONS

English translation of Kruass (DE 102018003563) (Year: 2018).*
(Continued)

*Primary Examiner* — Abby J Flynn
*Assistant Examiner* — Kyle J Kingsland
(74) *Attorney, Agent, or Firm* — MCDONNELL BOEHNEN HULBERT & BERGHOFF LLP

(57) ABSTRACT

A vehicle includes an image acquisition unit, a cap provided on a body of the vehicle and configured to open and close a replenishing port for replenishing an energy source, a driving unit allowing the cap to be separated or connected from/to the body, and a controller configured to determine an intention of a user to replenish the energy source on the basis of an image acquired by the image acquisition unit, and control the driving unit such that the cap is automatically separated from the body in response to determining that the intention of the user to replenish the energy source exists.

9 Claims, 12 Drawing Sheets

(51) Int. Cl.

| | |
|---|---|
| *B60L 53/16* | (2019.01) |
| *B60L 53/30* | (2019.01) |
| *B60L 53/37* | (2019.01) |
| *B60L 53/66* | (2019.01) |
| *E05B 83/34* | (2014.01) |
| *G06V 20/56* | (2022.01) |
| *G06V 40/16* | (2022.01) |
| *G06V 40/20* | (2022.01) |

(52) U.S. Cl.

CPC ............. *B60L 53/37* (2019.02); *B60L 53/665* (2019.02); *E05B 83/34* (2013.01); *G06V 20/56* (2022.01); *G06V 40/166* (2022.01); *G06V 40/172* (2022.01); *G06V 40/20* (2022.01); *B60K 2015/0515* (2013.01); *B60K 2015/0538* (2013.01); *B60K 2015/0561* (2013.01); *E05F 2015/767* (2015.01); *E05Y 2400/32* (2013.01); *E05Y 2400/858* (2013.01); *E05Y 2900/534* (2013.01); *G06V 40/16* (2022.01)

(58) Field of Classification Search

CPC ........ B60L 53/305; B60L 53/37; E05B 83/34; G06V 20/56; G06V 40/20; G06V 40/16; E05Y 2400/32; E05Y 2400/858

See application file for complete search history.

(56) References Cited

FOREIGN PATENT DOCUMENTS

| CN | 106603969 | A |   | 4/2017 | |
|---|---|---|---|---|---|
| CN | 106809287 | A |   | 6/2017 | |
| CN | 107627873 | A |   | 1/2018 | |
| CN | 108269342 | A | * | 7/2018 | ......... G07C 9/00563 |
| DE | 102010007204 | A1 |   | 8/2011 | |
| DE | 102012021518 | A1 |   | 5/2014 | |
| DE | 102016211527 | A1 |   | 12/2017 | |
| DE | 102016223212 | A1 |   | 5/2018 | |
| DE | 102018003563 | A1 |   | 10/2018 | |
| JP | 2006-019845 | A |   | 1/2006 | |
| KR | 10-2011-0035492 | A |   | 4/2011 | |
| KR | 2013-0114247 | A |   | 10/2013 | |

OTHER PUBLICATIONS

English translation of Humpenoeder et al. (DE 102010007204) (Year: 2010).*

English translation of an (CN 108269342) (Year: 2018).*

English translation of Krauss (DE-102018003563) (Year: 2018).

English translation of Schlienz (DE-102016211527) (Year: 2017).

English translation of Humpenoeder (DE-102010007204) (Year: 2011).

* cited by examiner

FIG. 9

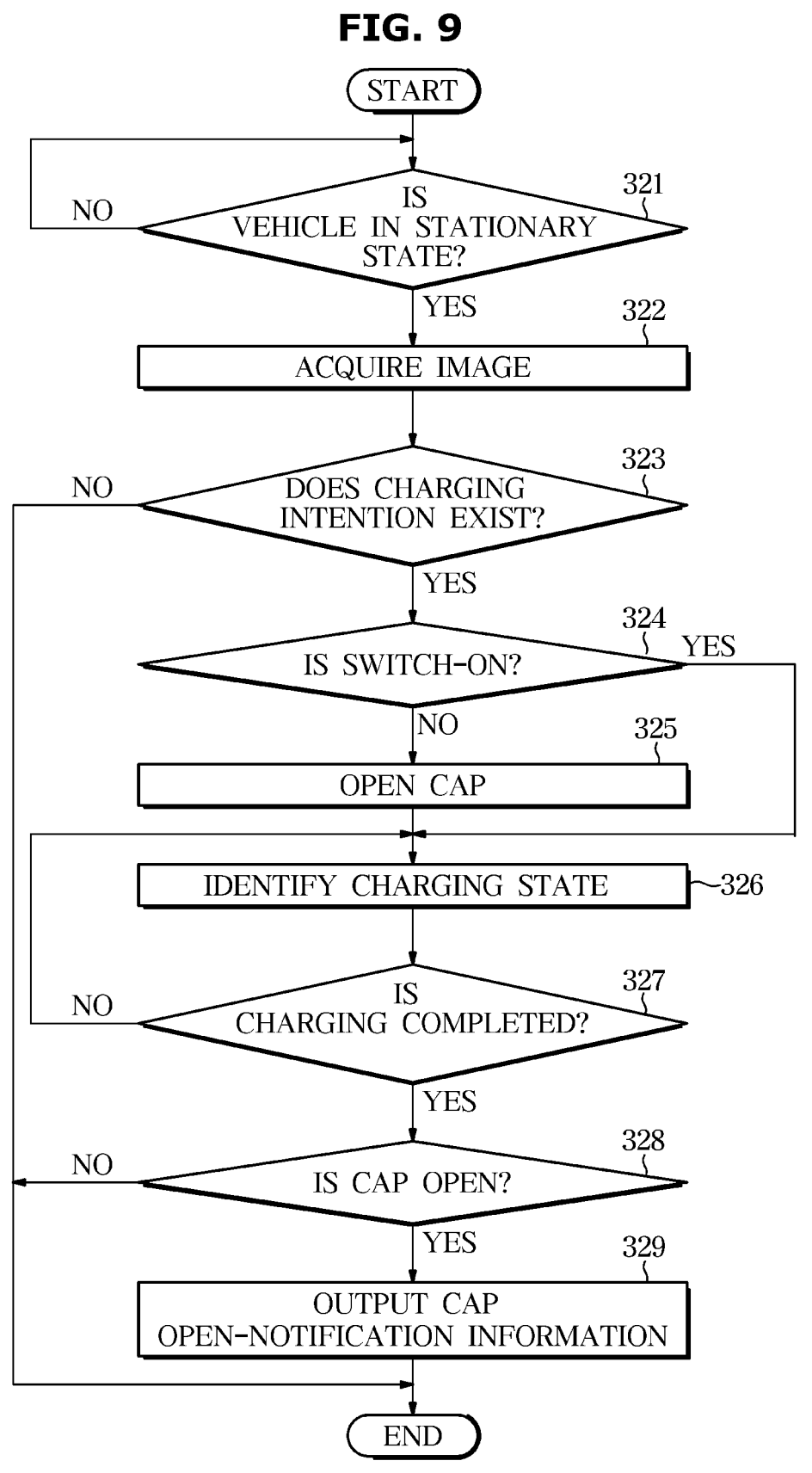

START

321 — IS VEHICLE IN STATIONARY STATE?

NO

YES

322 — ACQUIRE IMAGE

323 — DOES CHARGING INTENTION EXIST?

NO

YES

324 — IS SWITCH-ON?

YES

NO

325 — OPEN CAP

326 — IDENTIFY CHARGING STATE

327 — IS CHARGING COMPLETED?

NO

YES

328 — IS CAP OPEN?

NO

YES

329 — OUTPUT CAP OPEN-NOTIFICATION INFORMATION

END

VEHICLE INCLUDING A CAP THAT IS AUTOMATICALLY SEPARATED FROM A VEHICLE BODY

CROSS REFERENCE TO RELATED APPLICATION

The present application is a divisional of U.S. patent application Ser. No. 16/655,830, filed Oct. 17, 2019, which is based on and claims priority under 35 U.S.C. § 119 to Korean Patent Application No. 10-2018-0161569, filed on Dec. 14, 2018 in the Korean Intellectual Property Office, the disclosure of which are incorporated herein by reference.

BACKGROUND

1. Field

The preset disclosure relates to a vehicle capable of automatically opening a cap, such as a refueling cap or a charging cap.

2. Description of the Related Art

A vehicle represents a machine that travels on a road by driving vehicle wheels, and is equipped with various devices for protecting the occupant, assisting the drive, and improving the riding comfort.

The vehicle includes an internal combustion engine vehicle (a general engine driven vehicle) that generates mechanical power by burning petroleum fuels, such as gasoline and light oil and travels using the mechanical power, and an eco-friendly vehicle that travels on electricity to enhance the fuel efficiency and reduce toxic gas emissions.

Here, the eco-friendly vehicle includes: an electric vehicle that includes a battery, serving as a rechargeable power unit, and a motor such that the motor is rotated using the electricity accumulated in the battery and the vehicle wheels are driven using the rotation of the motor; a hybrid vehicle that includes an engine, a battery, and a motor and travels by controlling the mechanical power of the engine and the electric power of the motor; and a hydrogen fuel cell vehicle.

The eco-friendly vehicle is supplied with external power when a wired plug of a charger disposed in a parking lot or a charging station is connected to a charging port of the vehicle, and charges the battery using the supplied power.

The eco-friendly vehicle has a charging cap for opening and closing the charging port, and the charging cap is unlocked or opened as a switch provided in the vehicle is manipulated by the user.

In addition, the internal combustion engine vehicle also has a refueling cap for opening and closing a refueling port, and the refueling cap is unlocked or opened when a switch provided in the vehicle is manipulated by the user.

Accordingly, when the user alights from the vehicle in order to charge or refuel the vehicle without the switch being manipulated, there is a hassle to move to the driver's seat again, open the door of the driver's seat, and manipulate the switch.

SUMMARY

Therefore, it is an object of the present disclosure to provide a vehicle capable of automatically opening a cap in response to recognizing an intention of a driver to charge or refuel the vehicle.

It is another object of the present disclosure to provide a vehicle capable of outputting open-cap notification information to a user or automatically controlling the closing of a cap when the cap is open in a state that the charging or refueling is completed.

Additional aspects of the disclosure will be set forth in part in the description which follows and, in part, will be obvious from the description, or may be learned by practice of the disclosure.

Therefore, it is an aspect of the present disclosure to provide a vehicle including: an image acquisition unit; a cap provided on a body of the vehicle and configured to open and close a replenishing port for replenishing an energy source; a driving unit allowing the cap to be separated or connected from/to the body; and a controller configured to determine an intention of a user to replenish the energy source on the basis of an image acquired by the image acquisition unit, and control the driving unit such that the cap is automatically separated from the body in response to determining that the intention of the user to replenish the energy source exists intention.

The image acquisition unit may be provided at a position adjacent to the cap on the body.

The controller may recognize an object in an image acquired by the image acquisition unit, determine whether a charging gun or a refueling gun exists among the recognized objects, and determine that the intention of the user to replenish the energy source exists in response to determining the charging gun or refueling gun to exist among the recognized objects.

The controller may recognize a face among the recognized objects, determine whether the recognized face corresponds to a face of the user, and when the recognized face corresponds to the face of the user, unlock the cap.

The controller may control the driving unit such that the cap is automatically closed when the replenishment of the energy source is completed.

The vehicle may further include an obstacle detector provided at a position adjacent to the cap and configured to detect an obstacle, wherein the controller may acquire a distance to the obstacle on the basis of a detection signal detected by the obstacle detector, and when the acquired distance to the obstacle is less than or equal to a predetermined distance, may activate an operation of the image acquisition unit.

The controller may activate an operation of the image acquisition unit when a time for which the acquired distance to the obstacle remains less than or equal to the predetermined distance is longer than or equal to a predetermined time.

The vehicle may further include: a plurality of obstacle detectors provided at different positions on the body and configured to detect an obstacle; a storage configured to sequentially store pieces of identification information of the obstacle detectors corresponding to an energy source replenishment path; and an alighting detector configured to determine whether the user alights from the vehicle, wherein the controller may determine whether the user alights from the vehicle on the basis of a detection signal detected by the alighting detection signal, may identify identification information of an obstacle detector that outputs a detection signal among the plurality of obstacle detectors and a detection order of the obstacle in response to determining that the user alights the vehicle, may determine a movement path of the user on the basis of the identified identification information of the obstacle detector and the identified detection order, and may activate the operation of the image acquisition unit when the movement path coincides with the energy source replenishment path.

The controller may acquire distances to an obstacle on the basis of detection signals detected by the plurality of obstacle detectors, and identify identification information of an obstacle detector that outputs a detection signal associated with a distance among the acquired distances that is less than or equal to a predetermined distance.

It is another aspect of the present disclosure to provide a vehicle including: a plurality of obstacle detectors provided at different positions on a body and configured to detect an obstacle; a cap provided on a body of the vehicle and configured to open and close a replenishing port for replenishing an energy source; a driving unit allowing the cap to be separated or connected from/to the body; and a controller configured to determine an intention of a user to replenish the energy source on the basis of a detection signal output by at least one obstacle detector among the plurality of obstacle detectors, and control the driving unit such that the cap is automatically from the body in response to determining that the intention of the user to replenish the energy source exists.

The vehicle may further include: a storage configured to sequentially store pieces of identification information of the obstacle detectors corresponding to an energy source replenishment path; and an alighting detector configured to determine whether the user alights from the vehicle, wherein the controller determines whether the user alights from the vehicle on the basis of a detection signal detected by the alighting detection signal, identifies identification information of the at least one obstacle detector among the plurality of obstacle detectors and an detection order of the obstacle in response to determining that the user alights from the vehicle, determines a movement path of the user on the basis of the identified identification information of the at least one obstacle detector and the identified detection order, and determines that the intention of the user to replenish the energy source exists when the movement path coincides with the energy source replenishment path.

The controller may acquire a distance to the obstacle on the basis of a detection signal detected by the at least one obstacle detector, and may determine that the intention of the user to replenish the energy source exists when the acquired distance to the obstacle is less than or equal to a predetermined distance.

The controller may determine that the intention of the user to replenish the energy source exists when a time for which the acquired distance to the obstacle remains less than or equal to the predetermined distance is longer than or equal to a predetermined time.

The vehicle may further include a communication device configured to perform communication with a remote controller, wherein the controller may determine whether the remote controller in remote communication is located outside the body, and may determine that the intention of the user to replenish the energy source exists in response to determining that the remote controller is located outside the body.

The controller may control the driving unit such that the cap is automatically closed in response to determining that the replenishment of the energy source is completed.

The vehicle may further include an output unit, wherein the controller, in response to determining that the replenishment of the energy source is completed, may determine whether the cap is open, and in response to determining that the cap is open, may control the output unit to output open-cap notification information through the output unit.

The vehicle may further include: a speed detector configured to detect a travel speed; and a cap input configured to receive a command for opening the cap, wherein the controller may determine whether the vehicle is in a stationary state on the basis of the detected travel speed, and in response to determining that the vehicle is in a stationary state, may determine whether the command for opening the cap is received, and in response to determining that the command for opening the cap is not received, may identify a detection signal of the plurality of obstacle detectors to determine whether the intention of the user to replenish the energy source exists.

The vehicle may further include: a position receiver configured to receive current position information; and a storage configured to store map information, wherein the controller may determine whether a current position is a gas station or a charging station on the basis of the current position information and the map information, and in response to determining that the current position corresponds to the gas station or the charging state, and may identify a detection signal of the plurality of obstacle detectors to determine whether the intention of the user to replenish the energy source exists.

It is another aspect of the present disclosure to provide a vehicle including: a communication device configured to perform communication with a communication module provided in a charging station or a gas station; a cap provided on a body of the vehicle and configured to open and close a replenishing port for replenishing an energy source; a driving unit allowing the cap to be separated or connected from/to the body; and a controller configured to control the driving unit such that the cap is separated from the body when the communication device performs communication with the communication module.

The vehicle may further include an input configured to receive at least one of a replenishment time, a replenishment cost and a replenishment amount of the energy source, wherein the controller may control the communication device to transmit the at least one of the replenishment time, the replenishment cost and the replenishment amount of the energy source received through the input to the communication module.

The controller may control the driving unit such that the cap is automatically closed in response to determining that the replenishment of the energy source is completed.

BRIEF DESCRIPTION OF THE FIGURES

These and/or other aspects of the disclosure will become apparent and more readily appreciated from the following description of the embodiments, taken in conjunction with the accompanying drawings of which.

5

Figure 7:
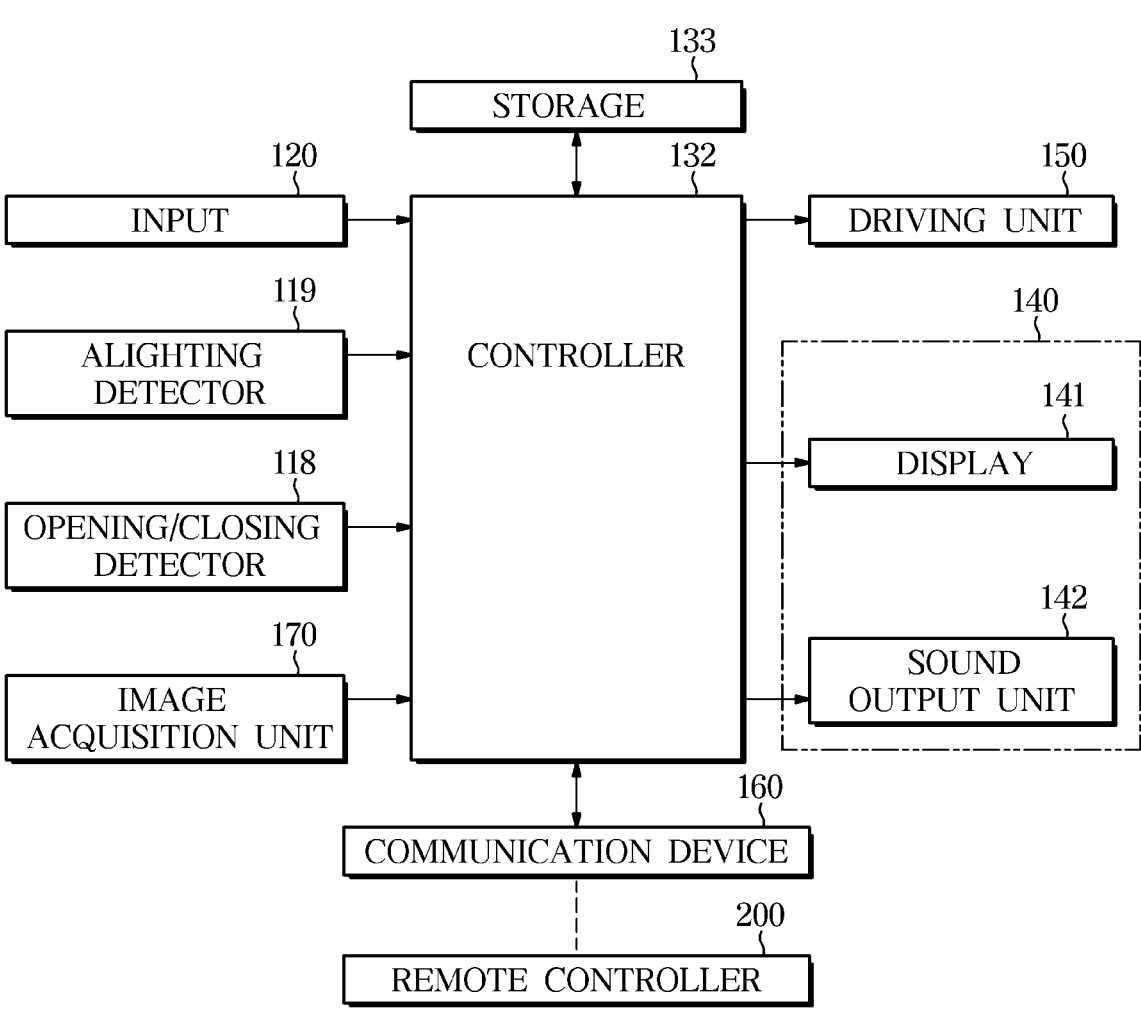

FIG. 7 is a control block diagram illustrating a vehicle according to another embodiment.

Figure 8:
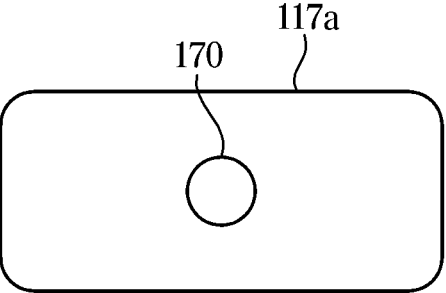

FIG. 8 is an exemplary diagram illustrating an image acquisition unit provided in a vehicle according to another embodiment.

FIG. 9 is a flowchart showing a method of controlling a vehicle according to another embodiment.

Figure 10:
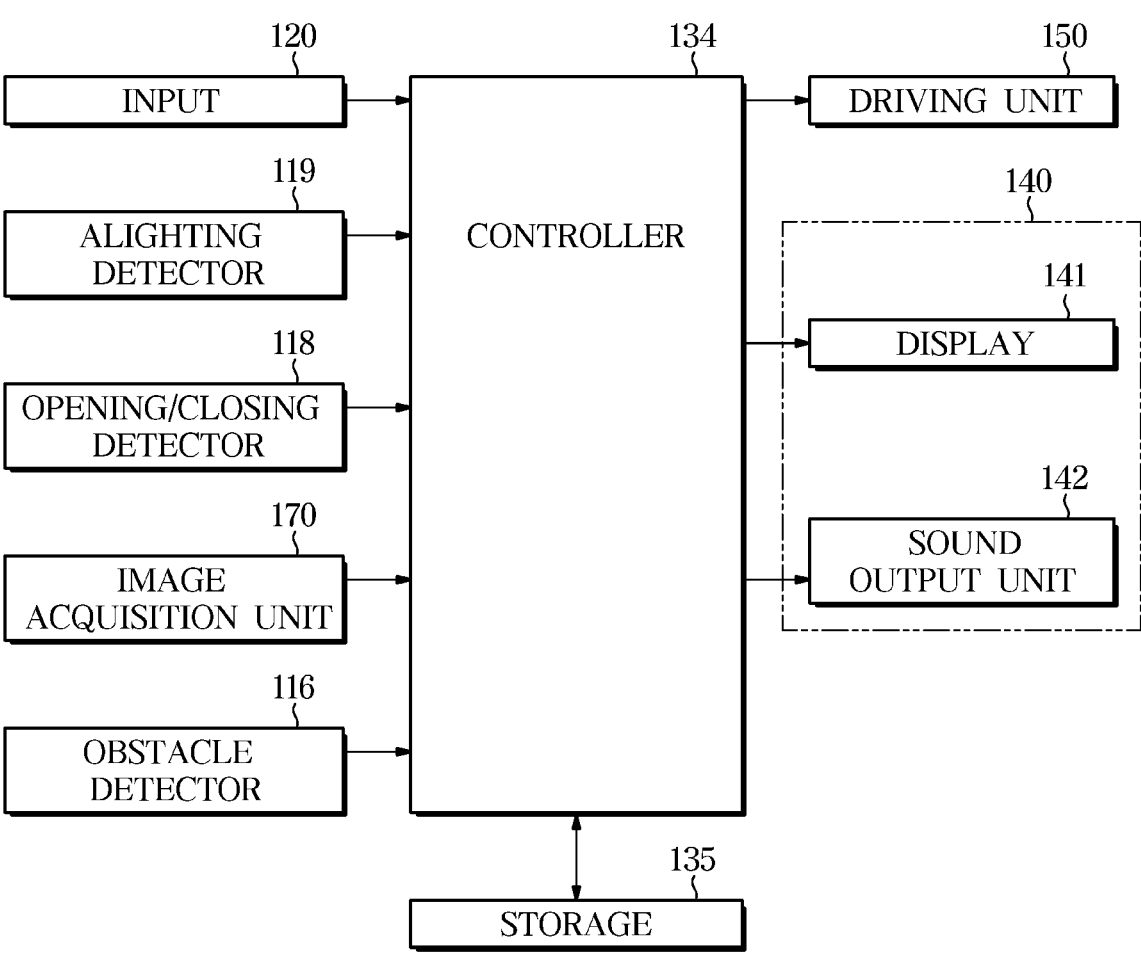

FIG. 10 is a control block diagram illustrating a vehicle according to another embodiment.

Figure 11:
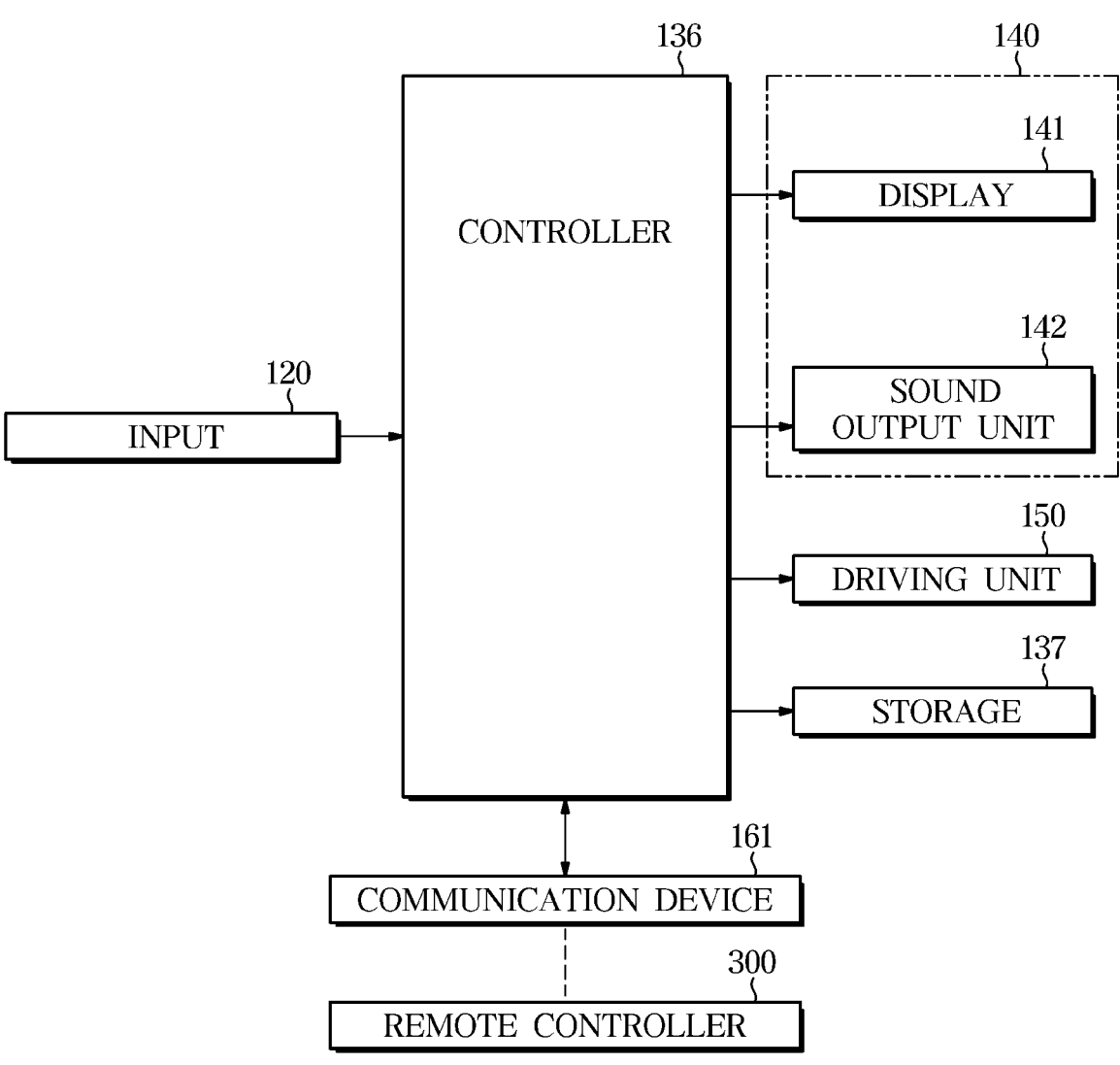

FIG. 11 is a control block diagram illustrating a vehicle according to another embodiment.

Figure 12:
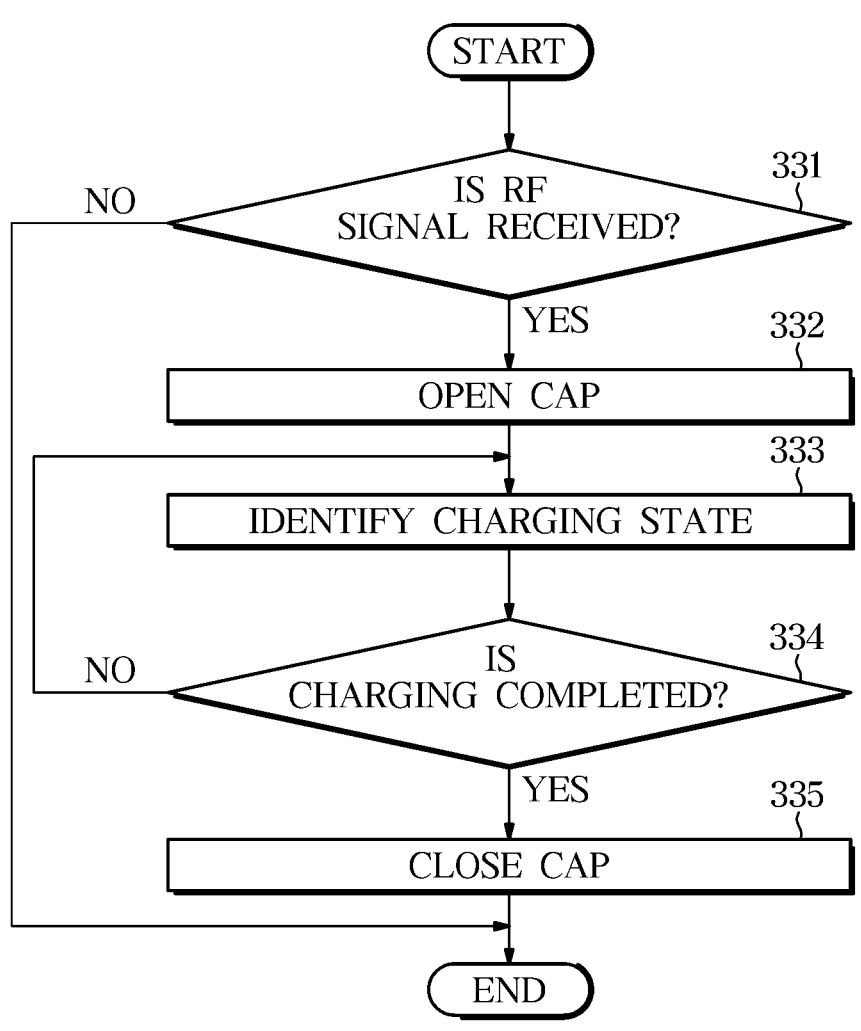

FIG. 12 is a flowchart showing a method of controlling a vehicle according to another embodiment.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 1:
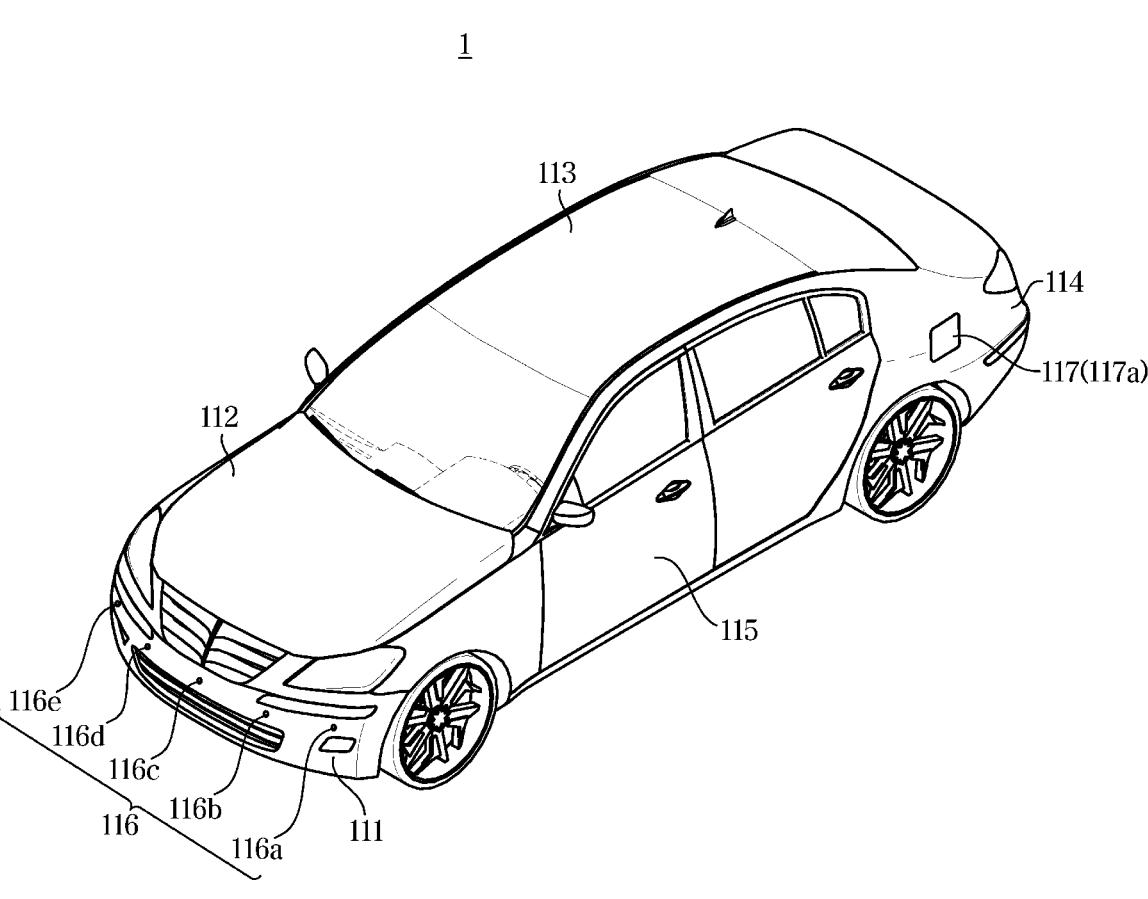
FIG. 1 is an exemplary diagram illustrating an external appearance of a vehicle according to an embodiment of the present disclosure.
Figure 2:
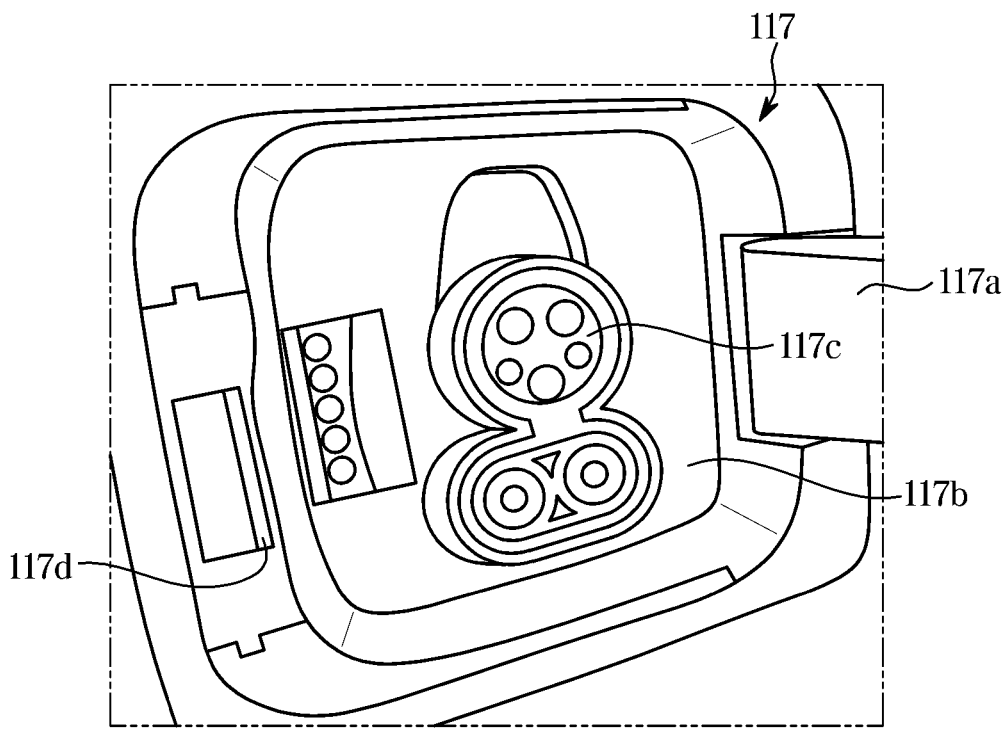
FIG. 2 is an exemplary diagram illustrating a charging unit of the vehicle shown in FIG. 1.
Figure 3:
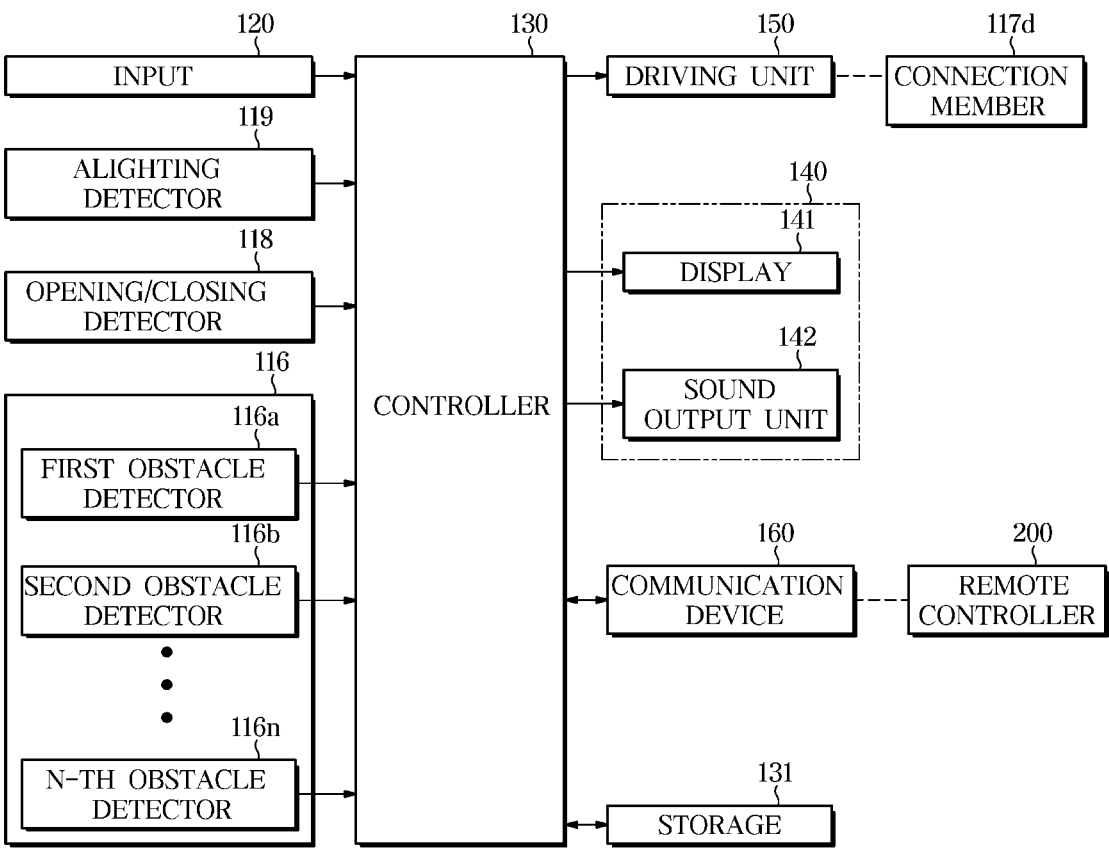
FIG. 3 is a control block diagram illustrating a vehicle according to an embodiment.

FIG. 1 is an exemplary diagram illustrating an external appearance of a vehicle according to an embodiment of the present disclosure, FIG. 2 is an exemplary diagram illustrating a charging unit of the vehicle shown in FIG. 1, and FIG. 3 is a control block diagram illustrating a vehicle according to an embodiment.

A vehicle according to an embodiment is an eco-friendly vehicle that travels using a battery and a motor, and may include an electric vehicle or a plug-in hybrid electric vehicle (PHEV).

The vehicle 1 includes a body and a chassis, which is a part of the vehicle 1 except for the body, on which mechanical devices required for traveling are installed.

Referring to FIG. 1, the body of the vehicle 1 includes a front panel 111, a bonnet 112, a roof panel 113, a rear panel 114, front, rear, left, and right doors 115, and a window glass provided at each of the front, rear, left, and right doors 115 to be openable and closable.

The body of the vehicle 1 includes pillars provided at the boundaries between the window glasses of the front, rear, right and left doors, a side mirror for providing the driver with a rear view of the vehicle 1, and an external lamp for allowing the driver to easily view information of a surrounding while looking to the front, signaling to other vehicles and pedestrians, and serving to communicate with vehicles and pedestrians.

The vehicle 1 includes an obstacle detector 116 that detects an obstacle around the vehicle 1 and detects a distance to the detected obstacle.

The obstacle detector 116 may be provided on at least one of the front panel 111 and the rear panel 114 of the vehicle 1.

In addition, the obstacle detector 116 may be provided on a side seal panel at a lower side of the door 115.

The obstacle detector 116 detects the existence of an obstacle in the front, rear, left, and right directions and the position of the obstacle on the basis of the position of the subject vehicle. Here, the position may include the distance and the direction.

In more detail, the obstacle detector 116 detects an obstacle located outside the subject vehicle, for example, a preceding vehicle traveling in front of the subject vehicle, a stationary object, such as a structure installed around the road, another vehicle approaching the vehicle from an opposite lane, a pedestrian, and the like.

That is, the obstacle detector 116 outputs detection information of the obstacles located on the front, rear, left and right sides of the subject vehicle.

The obstacle detector 116 may include a radar sensor or a light detection and ranging (LiDaR) sensor.

The radar sensor is a sensor configured to, once radio waves have been emitted, detect the position and distance of an object using reflected waves generated by the emission of the radio waves when transmission and reception are performed in the same place.

The LiDAR sensor is a non-contact type distance detection sensor using the principles of a laser radar.

Since the LiDAR sensor has a higher accuracy in lateral direction detection when compared to the radar sensor, the use of LiDaR sensor may increase the accuracy in determining the existence of a passage in front of the vehicle. Here, the laser may represent a single laser pulse.

The obstacle detector 116 may include an ultrasonic sensor or a radar sensor.

The ultrasonic sensor generates ultrasonic waves for a certain period of time and then detects a signal returning after being reflected from an object.

The ultrasonic sensor may be used to determine the existence of an obstacle, such as a pedestrian, within a short range.

The chassis may be a frame for supporting the body to mount wheels at the front, rear, left and right side thereof, a power device for applying a driving force to the front, rear, left, and right wheels, a steering device, a braking device for applying a braking force to the front, rear, left, and right vehicles, and a suspension device thereon.

The power device may include a power generation device and a power transmission device.

In the case of an electric vehicle, the power generation device may include a battery and a motor.

In the case of a hybrid vehicle, the power generation device may include a battery, a motor, an engine, a fuel device, a cooling device, and a fuel supply device.

Here, the battery may represent a main battery that generates high-voltage current to supply a driving force to the vehicle.

The motor converts electric energy of the battery into mechanical energy for operating various devices provided in the vehicle.

In the case of a hybrid vehicle, the vehicle operates the motor when a start button is turned on, and drives the engine through the operation of the motor.

In addition, the hybrid vehicle may represent a plug-in hybrid vehicle that charges the battery using external power.

The power transmission device may include at least one of a clutch, a transmission, a final gear reduction device, a differential device, and an axle.

Such a vehicle requires charging of the battery for power generation.

The vehicle includes a charging unit 117 for charging the battery that is an energy source of the vehicle.

Referring to FIG. 2, the charging unit 117 includes a charging cap 117a which can be rotatable, a receiving portion 117b having a receiving space and opened and closed by the charging cap 117a, a charging port 117c disposed in the receiving portion 117b and into which a connector of an external charging cable is inserted, and a connection member 117d allowing the charging cap 117a to be locked or unlocked to/from the body of the vehicle and allowing the charging cap 117a to be connected or separated to/from the body of the vehicle.

The charging unit 117 may be provided on at least one of the front panel, the rear panel, a fender panel on the left side, and a fender panel on the right side.

Here, the charging port may represent a replenishing port into which a connector for replenishing the energy source is inserted.

FIG. 3 is a control block diagram illustrating a vehicle according to an embodiment.

The vehicle includes the obstacle detector 116, an opening/closing detector 118, an alighting detector 119, an input 120, a controller 130, a storage 131, an output unit 140, a driving unit 150, and a communication device 160.

The obstacle detector 116 detects the existence of an obstacle around the vehicle.

The obstacle detector 116 may detect the distance to the obstacle around the vehicle and transmit a detection signal regarding the detected distance to the controller 130. The obstacle detector 116 may be provided in a plurality of units thereof.

The plurality of obstacle detectors 116 may be provided on the respective panels of the vehicle, and may output a detection signal corresponding to the distance to the obstacle only upon detection of an obstacle.

The opening/closing detector 118 is electrically or mechanically connected to the connection member 117d of the charging unit to detect a state of the charging cap 117a being opened or closed.

For example, the opening/closing detector 118 is a device for detecting the opening/closing of the charging cap 117a, and may include a reed switch, a micro switch, a magnetic sensor, a Hall sensor, a photo sensor, or the like.

The alighting detector 119 detects a state in which the driver alights from (exits) the vehicle, and outputs a detection signal corresponding to the alight to the controller 130.

The alighting detector 119 may be a weight detector, a pressure detector, an electrostatic capacity detector provided on a driver's seat, a fastening detector provided on a seat belt to detect the fastened state of the seat belt, or a door opening/closing detector configured to detect an opening/closing of the door of the driver's seat.

The alighting detector 119 may be further provided on at least one of the passenger seat or the rear seat.

The input 120 receives operational commands of various functions.

The input 120 may be provided in a head unit and a center fascia in the vehicle, or may be provided on a steering wheel, in a door, or on a console box.

The input 120 may receive information about at least one of the replenishment amount, the replenishment cost, and the replenishment time of the energy source.

The input 120 may include a cap input for receiving a cap-opening command for opening the charge cap 117a.

Here, the cap input may be provided as a switch type, a button type, a touch type, or a key type.

In a case that an actuator for automatically closing the charging cap 117a is provided in the driving unit, the cap input may receive the command for closing the charging cap 117a from the user.

The controller 130 may determine a charging intention of the user, and in response to determining that the user has a charging intention, may control the driving unit 150 to automatically open the charging cap 117a.

In the determining of the charging intention of the user, the controller 130 may acquire the position of the user on the basis of the detection signal output from the obstacle detector 116, may determine whether the position of the user is adjacent to the charging cap 117a, and in response to determining that the position of the user is adjacent to the charging cap 117a, may determine that the user has a charging intention and control the driving unit 150 to automatically open the charging cap 117a.

In the determining of whether the user is adjacent to the charging cap 117a, the controller 130 may determine that the position of the user is adjacent to the charging cap 117a when it is determined that the user is located within a predetermined distance from the charging cap 117a.

In the determining of the charging intention of the user, the controller 130 may identify a time for which the position of the user remains within the predetermined distance to the charging cap 117a, and in response to the identified time determined to be longer than or equal to a predetermined time, may determine that the user has a charging intention.

In the controlling of the driving unit 150 to automatically the charging cap 117a, the controller 130 may change the charging cap 117a from a locked state to an unlocked state.

In the changing of the state of the charging cap 117a from a locked state to a unlocked state, the controller 130 may allow the charging cap 117a to be separated from the connection member 117d.

In the changing of the state of the charging cap 117a from the locked state to the unlocked state, the controller 130 may release the lock while keeping the charging cap 117 connected to the connection member 117d. In this case, the user may apply an external force to the charging cap 117d to open the charging cap 117a. In addition, when the charging is completed, the user may apply an external force to the charging cap 117a to close the charging cap 117a. That is, the charging cap 117a may be provided in a push-type.

In a case that the vehicle only has an opening and closing device for opening and closing the charging cap without having no separate locking device for locking the charging cap, the controller 130 may allow the charging cap 117a to be separated from the connection member 117*d* in the controlling of the driving unit 150 to automatically open the charging cap 117*a*.

In a case that the vehicle is provided with a cap input, the controller 130, in response to determining that the user has a charging intention, may determine whether a cap-opening signal is received from the cap input. The controller 130, in response to determining that the cap-opening signal is not received, may control the driving unit 150 to automatically open the charging cap 117*a*, and in response to determining that the cap-opening signal is received, may not perform the automatic opening of the charging cap 117*a*.

The vehicle may further include a speed detecting unit for detecting the travelling speed.

The speed detecting unit may include a plurality of wheel speed sensors provided in a plurality of wheels of the vehicle, and may include an acceleration sensor for detecting acceleration of the vehicle.

The controller 130 may determine whether the vehicle is in a stationary state on the basis of the detection signal detected by the speed detector, and in response to determining that the vehicle is in a stationary state, may determine whether the user alights from the vehicle on the basis of the detection signal detected by the alighting detector, and in response to determining that the user alights from the vehicle, may determine that the user has a charging intention.

In addition, the controller 130, in response to determining that the ignition of the vehicle is turned off, may supply power to the obstacle detector and the driving unit for a preset period of time from the time when the ignition of the vehicle is turned off to determine the charging intention of the user.

The controller 130, in response to determining that the user has alighted from the vehicle, may determine whether a cap-opening signal is received from the cap input, and in response to determining that the cap opening signal is not received from the cap input, may determine the charging intention of the user on the basis of the detection signal detected by the obstacle detector, and in response to determining that the cap opening signal is received from the cap input, may omit the determination of the charging intention of the user.

In a case that the obstacle detector is provided as a single unit in the vehicle, the controller 130 acquires the position of the obstacle on the basis of the detection signal detected by the single obstacle detector, compares the position of the obstacle with the position of the charging cap to determine the charging intention of the user. That is, the controller 130, in response to determining that the user is positioned within a predetermined distance from the charging cap, may determine that the user has a charging intention.

In a case that the obstacle detector is provided in a plurality of units thereof in the vehicle, the controller 130 may acquire the position of the user on the basis of the detection signals detected by the plurality of obstacle detectors.

In this case, the controller 130 may acquire a change in position of the user on the basis of the reception order of the detection signals detected by the plurality of obstacle detectors.

That is, the controller 130, in response to receiving detection signals of detecting an obstacle which are output from the plurality of obstacle detectors, may acquire the reception order of the detection signals on the basis of the reception time at which the detection signal is received, may acquire the installation positions of the obstacle detectors having output the detection signals of the obstacle on the basis of the acquired reception order, may acquire a change in position of the user from the installation positions of the obstacle detectors corresponding to the reception order of the detection signals, may compare a movement path of the user corresponding to the acquired change in position of the user with a charging path stored in the storage 131, and when the acquired movement path of the user coincides with the charging path, may determine that the user has a charging intention.

The controller 130 may acquire the distances of each of the plurality of obstacle detectors to the user on the basis of the detection signals detected by the plurality of obstacle detectors, and may acquire the movement path of the user on the basis of the installation position of an obstacle detector having output a detection signal associated with a distance among the acquired distances that is less than a predetermined distance.

The controller 130 may monitor the charging state of the battery to determine whether the charging of the battery is completed, and in response to determining that the charging is completed, determine whether the charging cap is open, and in response to determining that the charging cap is open, may control the operation of an output unit 140 such that open-charging cap notification information is output through the output unit 140.

In addition, the controller 130 may monitor the charged amount of the battery on the basis of at least one of the current, voltage, and temperature of the battery.

The controller 130 may determine that the charging is completed when the connector of the charging cable is disconnected from the charging port or when the charging state of the battery is determined to be in a full-state.

The controller 130 may determine that the charging is completed when the charging time of the battery is the time desired by the user or the charging cost of the battery is the amount of money provided by the user.

The controller 130 may determine the boarding state of the user on the basis of the detection signal detected by the alighting detector. In this case, the controller 130, in response to determining that the user has boarded the vehicle, may monitor the charging state of the battery to determine whether the charging of the battery is completed, and in response to determining the charging is completed, may determine whether the charging cap is open, and in response to determining that the charging cap is open, may control the operation of the output unit 140 such that the open-charging cap notification information is output through the output unit 140.

The storage 131 stores pieces of identification information and installation position information of the plurality of obstacle detectors.

The storage 131 stores pieces of identification information of obstacle detectors corresponding to a charging path for charging the battery with an energy source.

Here, the charging path is an energy source replenishment path, that is, a path along which the driver moves from the driver's seat to the charging cap. When the driver moves along the charging path, the detection signals from a plurality of obstacle detectors installed to correspond to the charging path may be sequentially output.

Details thereof will be described with reference to FIG. 4.

Figures 4A, 4B, 4C, 4D:
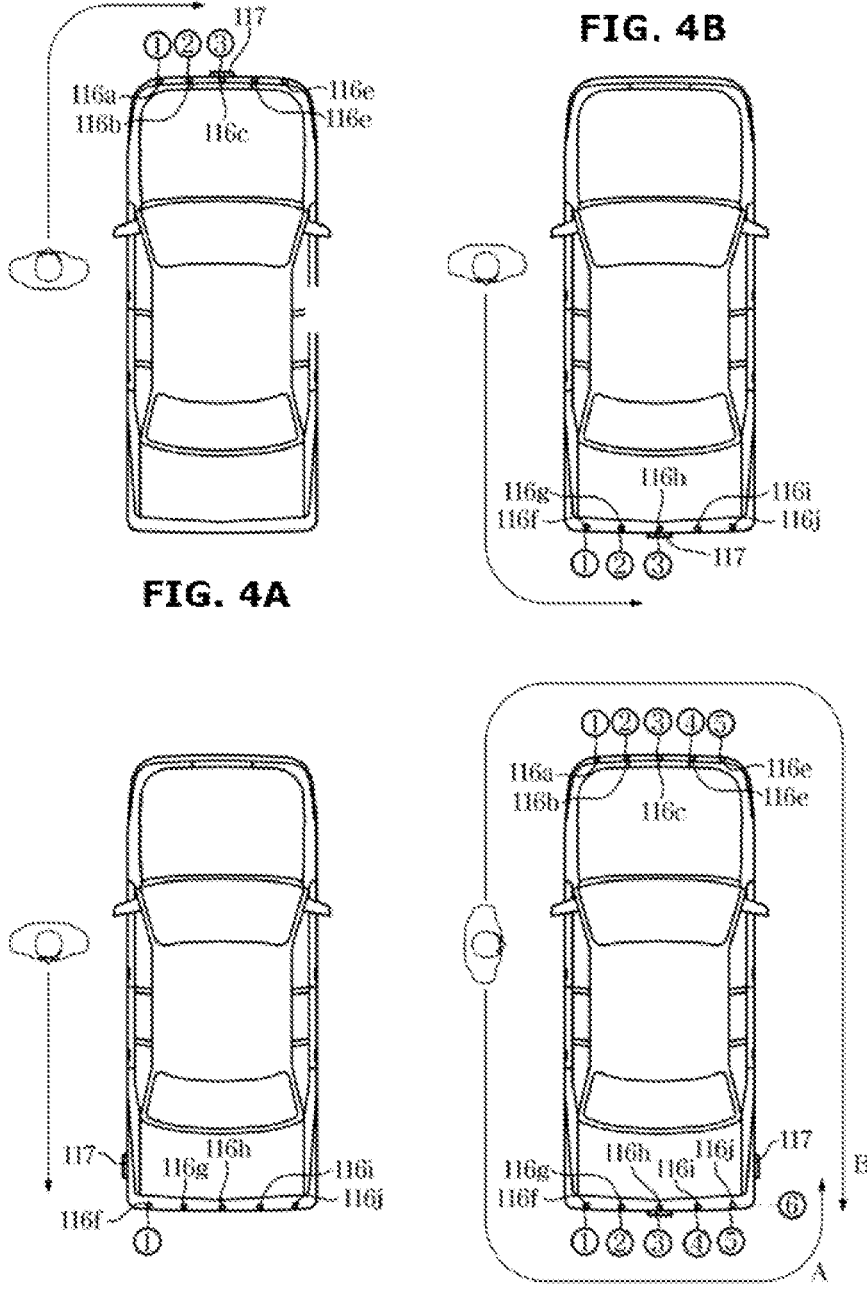
FIGS. 4A, 4B, 4C, and 4D are exemplary diagrams illustrating a charging path stored in a vehicle according to an embodiment.

FIG. 4A is an exemplary diagram illustrating a charging path in a case that the charging cap of the charging unit 117 is provided adjacent to the front panel 111.

In order to charge the battery of the vehicle, the user alighting from the vehicle moves from the door of the driver's seat to the front of the vehicle and then to the charging unit provided at the center of the front panel.

In this case, an obstacle detector 116a provided on the left side of the front panel 111 and approached by the user first outputs a detection signal of the obstacle for the first time, an obstacle detector 116b provided between the left side and the center side of the front panel 111 and approached by the user next outputs a detection signal of the obstacle for the second time, and an obstacle detector 116c provided at the center of the front panel and approached by the user finally outputs a detection signal of the obstacle for the third time.

Accordingly, the vehicle may store the order of the first obstacle detector 116a, the second obstacle detector 116b, and the third obstacle detector 116c that output the detection signals in the storage as information corresponding to the charging path.

FIG. 4B is an exemplary diagram illustrating a charging path in a case that the charging cap of the charging unit 117 is provided adjacent to the rear panel 114.

In order to charge the battery of the vehicle, the user alighting from the vehicle moves from the door of the driver's seat to the rear side of the vehicle and then to charging unit provided at the center of the rear panel.

In this case, an obstacle detector 116f provided on the left side of the rear panel 114 and approached by the user first outputs a detection signal of the obstacle for the first time, an obstacle detector 116g provided between the left side and the center side of the rear panel 114 and approached by the user next outputs a detection signal of the obstacle for the second time, and an obstacle detector 116h provided at the center of the rear panel 114 and approached by the user finally outputs a detection signal of the obstacle for the third time.

Accordingly, the vehicle may store the order of the obstacle detector 116f, the obstacle detector 116g, and the obstacle detector 116h that output the detection signals in the storage as information corresponding to the charging path.

FIG. 4C is an exemplary diagram illustrating a charging path in a case that the charging cap of the charging unit 117 is provided adjacent to the left fender panel.

In order to charge the battery of the vehicle, the user alighting from the vehicle moves from the door of the driver's seat toward the rear side of the vehicle to the charging unit provided at the fender panel.

In this case, the obstacle detector 116f provided on the left side of the rear panel 114 and approached by the user first outputs a detection signal of the obstacle.

Accordingly, the vehicle may store the obstacle detector 116f that outputs the detection signal in the storage as information corresponding to the charging path.

FIG. 4D is an exemplary diagram illustrating a charging path in a case that the charging cap of the charging unit 117 is provided adjacent to the right fender panel, in which the charging path may include two charging paths.

Hereinafter, the first charging path A will be described.

In order to charge the battery of the vehicle, the user alighting from the vehicle moves from the door of the driver's seat toward the rear side of the vehicle and then to the charging unit provided at the right fender panel.

In this case, the obstacle detector 116f provided on the left side of the rear panel 114 and approached by the user first outputs a detection signal of the obstacle for the first time, the obstacle detector 116g provided between the left side of the rear panel and the center of the rear panel and approached by the user next outputs a detection signal of the obstacle for the second time, the obstacle detector 116h provided at the center of the rear panel and approached by the user next outputs a detection signal of the obstacle for the third time, an obstacle detector 116i provided between the center and the right side of the rear panel and approached by the user next outputs a detection signal of the obstacle for the fourth time, and an obstacle detector 116j provided at the right side of the rear panel and approached by the user finally outputs a detection signal of the obstacle for the fifth time.

Accordingly, the vehicle may store the order of the obstacle detector 116f, the obstacle detector 116g, the obstacle detector 116h, the obstacle detector 116i, and the obstacle detector 116j that output the detection signals in the storage as information corresponding to the first charging path.

Hereinafter, the second charging path B will be described.

In order to charge the battery of the vehicle, the user alighting from the vehicle moves from the door of the driver's seat toward the front side of the vehicle and then to the charging unit provided at the right fender panel.

In this case, the obstacle detector 116a provided on the left side of the front panel 111 and approached by the user first outputs a detection signal of the obstacle for the first time, the obstacle detector 116b provided between the left side and the center of the front panel 111 and approached by the user next outputs a detection signal of the obstacle for the second time, the obstacle detector 116c provided at the center of the front panel and approached by the user next outputs a detection signal of the obstacle for the third time, an obstacle detector 116d provided between the center and the right side of the front panel 111 and approached by the user next outputs a detection signal of the obstacle for the fourth time, an obstacle detector 116e provided at the right side of the front panel 111 and approached by the user next outputs a detection signal of the obstacle for the fifth time, and the obstacle detector 116j provided at the right side of the rear panel 114 and approached by the user finally outputs a detection signal of the obstacle for the sixth time.

Accordingly, the vehicle may store the order of the obstacle detector 116a, the obstacle detector 116b, the obstacle detector 116c, the obstacle detector 116d, the obstacle detector 116e, and the obstacle detector 116j that output the detection signals in the storage as information corresponding to the second charging path.

In consideration that the charging may be performed by a person who boards in the front passenger seat or in the rear seat rather than the driver, the storage 131 may further store a charging path from the passenger seat to the charging cap and a charging path from the rear seat to the charging cap.

The storage 131 may store a predetermined distance and a predetermined time for determining the charging intention of the user.

The output unit 140 outputs open-cap information for informing the opening of the charging cap when the charging is completed, so that the user closes the charging cap when the charging is completed.

The output unit 140 may include at least one of a display 141 and a sound output unit 142.

The display 141 displays the open-cap information for informing the opening of the charging cap in the form of an image when the charging cap is open in a state in which the charging is completed.

In other words, the display 141 may display guide information instructing that the charging cap should be closed because the charging cap is open.

The display 141 may be provided in a cluster, or may be provided in a dashboard, a head unit, and a center fascia in the vehicle.

The display 141 may be provided in the receiving portion 117*b* of the charging unit.

The sound output unit 142 outputs open-cap information for informing the opening of the charging cap in the form of a sound when the charging cap is open in a state in which the charging is completed.

In other words, the sound output unit 142 may output the guidance information instructing that the charging cap should be closed because the charging cap is open in the form of a speech, melody or warning sound.

The sound output unit 142 may include a speaker for outputting sounds such as a warning sound, a guidance sound, and the like.

The driving unit 150 separates the connection member 117*d* of the charging unit from the body in response to a control command of the controller 130.

The driving unit 150 may change the connection member 117*d* of the charging unit from the unlocked state to the locked state.

The driving unit 150 may change the connection member 117*d* of the charging unit from the connected state to the disconnected state.

The driving unit 150 may allow the connection member 117*d* of the charging unit to be changed from the connected state to the disconnected state when an external force is applied to the charging cap 117*a* by the user in a state in which the connection member 117*d* is changed to the unlocked state by the control command of the controller.

The driving unit 150 may include an actuator for separating the connection member 117*d* of the charging unit from the body.

The driving unit 150 may connect the connection member 117*d* of the charging unit to the body in response to a control command of the controller 130. In this case, the vehicle may further include an actuator for connecting the connection member 117*d* of the charging unit to the body.

The vehicle may further include a communication device 160 for performing communication with a remote controller 200.

The communication device 160 may transmit and receive a low frequency (LF) signal to/from the remote controller 200, or may transmit and receive a radio frequency (RF) signal to/from the remote controller 200 to exchange information therebetween.

The remote controller 200 communicating with the vehicle 1 may include a Fob type remote controller and a card type remote controller. Such a Fob type remote controller and a card type remote controller may perform bidirectional communication with the vehicle 1.

The Fob type remote controller and the card type remote controller transmit an authentication signal for automatically communicating with the vehicle 1 in response to receiving a signal from the vehicle 1 before transmitting a control signal to the vehicle 1.

The controller 130 may further include determining that the user has a charging intention in response to determining that the position of the obstacle is within a predetermined distance from the charging cap and communication with the remote controller 200 is performable.

The controller 130 may determine that the user has a charging intention in response to determining that the position of the obstacle is within a predetermined distance from the charging cap and the remote controller 200 having transmitted an authentication signal is located outside the vehicle.

In addition, the storage 131 may store identification information of the remote controller.

Here, the identification information of the remote controller may include an authentication signal.

The communication device 160 may further include a position receiver.

The position receiver receives position information corresponding to the current position of the vehicle.

The position receiver may include a Global Positioning System (GPS) receiver. The GPS receiver includes an antenna module for receiving signals of a plurality of GPS satellites and a signal processing unit.

The antenna module may be provided in an antenna provided on the exterior of the vehicle.

The signal processing unit includes software for acquiring the current position using distance and time information corresponding to the position signals of the plurality of GPS satellites, and a transmitter for transmitting the acquired position information of the vehicle.

In this case, the controller 130 may determine whether the vehicle is located at a charging station on the basis of the current position information and map information, and in response to determining that the vehicle is located at the charging station, may determine that the user has a charging intention.

The controller 130 may determine whether the vehicle is located at a charging station on the basis of the current location information and navigation information during execution of a navigation mode, and in response to determining that the vehicle is located at the charging station, may determine that the user has a charging intention.

Figure 5:
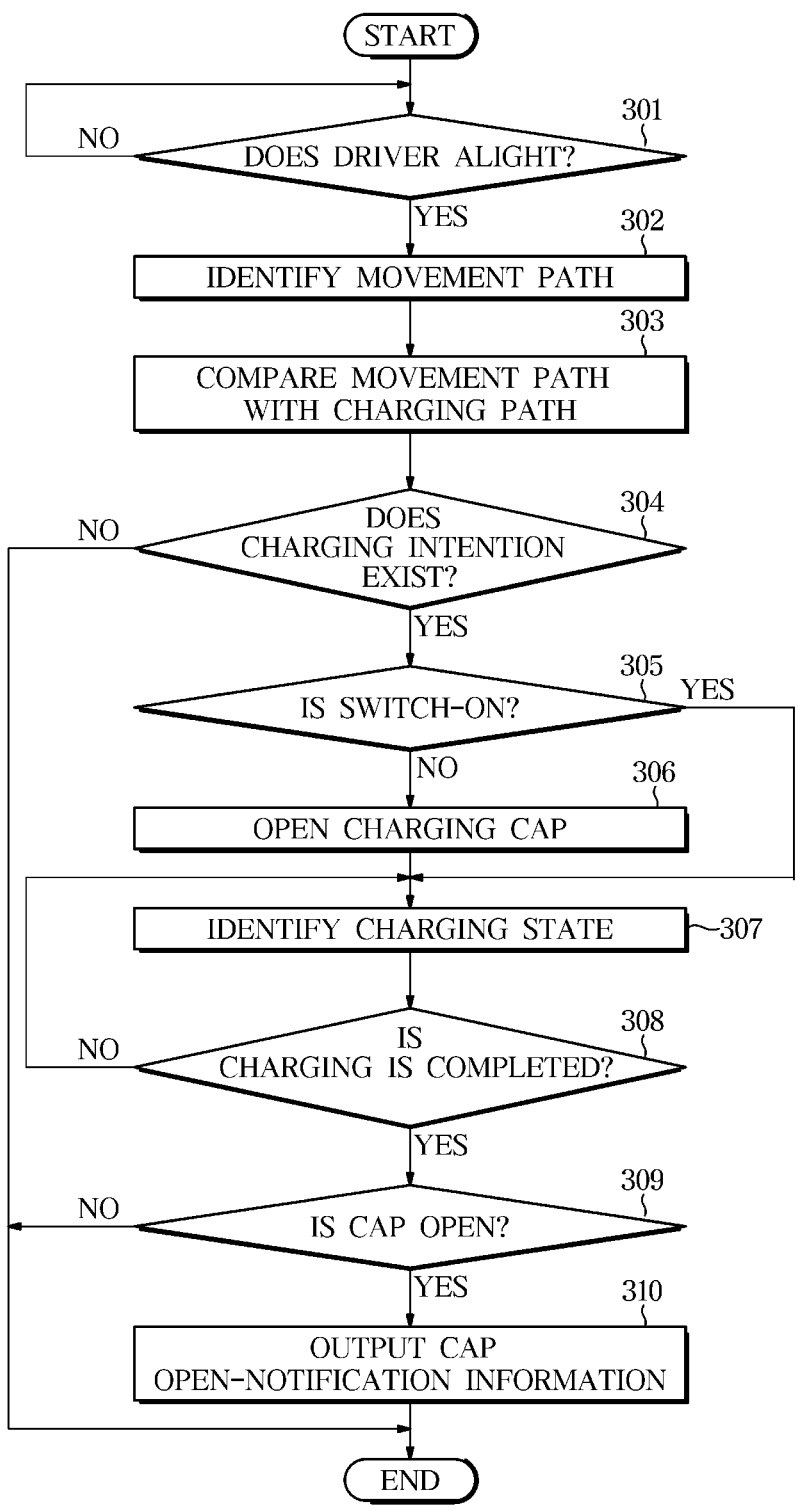
FIG. 5 is a flowchart showing a method of controlling a vehicle according to an embodiment.

FIG. 5 is a flowchart showing a method of controlling a vehicle according to an embodiment.

The vehicle may determine whether the user alights from the vehicle on the basis of the detection signal detected by the alighting detector (301), and in response to determining that the user has alighted from the vehicle, may identify a movement path of the user to determine whether the user has a charging intention (302).

Here, the determining of whether the user alights may include determining whether the door of the driver's seat is open.

In addition, the vehicle may determine whether the vehicle is in a stationary state on the basis of the detection signal detected by the speed detector, and in response to determining that the vehicle is in a stationary state, may determine whether the user has a charging intention. In addition, the vehicle, in response to the ignition of the vehicle being turned off, may determine whether the user has a charging intention.

The vehicle, in response to determining that the ignition of the vehicle is turned off, may supply power to the alighting detector, the obstacle detector, the driving unit, and the communication device for a preset period of time from the time when the ignition of the vehicle is turned off to operate the alighting detector, the obstacle detector, the driving unit, and the communication device, to determine whether the user has a charging intention.

The determining of the movement path of the user includes, in response to determining that an obstacle is detected by at least one obstacle detector, identifying the detection time at which the object is detected by each obstacle detector, identifying the installation positions of the obstacle detectors in the order of the earliest detection time first, acquiring a change in position of the user from the installation positions of the obstacle detectors corresponding to the order of the detection times, and identifying a movement path of the user corresponding to the acquired change in position of the user.

The vehicle may compare the identified movement path of the user with the charging path stored in the storage 131 (303), and determine whether the user has a charging intention on the basis of the compared information (304).

That is, the vehicle determines that the user has a charging intention when the acquired movement path and the charging path coincide with each other, and determine that the user has no charging intention when the acquired movement path and the charging path do not coincide with each other.

The vehicle may determine whether the current position is a charging station on the basis of the current position information and map information, and in response to determining that the current position is the charging station, may determine whether the user alights from the vehicle, and in response to determining that the user alights from the vehicle, may determine that the user has a charging intention.

The vehicle, in response to determining that the user has a charging intention, may determine whether an on-signal for opening the cap is received from a switch, which is a cap-input (305), and in response to determining that the on-signal is not received from the switch, may open the charging cap 117a (306).

The vehicle, in response to determining that the on-signal is received from the switch, may not perform the cap opening by determining that the charging cap 117a is opened by the user.

The vehicle may determine whether the on-signal for opening the cap is received from the switch, which is a cap input, in a state in which the user alights from the vehicle (305), and in response to determining that the on-signal is not received from the switch, may determine the movement path of the user to determine whether the user has a charging intention. In this case, the vehicle, in response to determining that the on-signal is received from the switch in a state in which the user alights from the vehicle, may omit the determining of the charging intention of the user. The vehicle may omit the identifying of the movement path of the user from the detection signals of the obstacle detectors.

In a case that the vehicle is not provided with the switch, which is a cap input, the vehicle may automatically open the charging cap 117a in response to determining that the user has a charging intention.

In the opening of the charging cap, the vehicle may change the charging cap from the locked state to the unlocked state and allow the unlocked charging cap to be separated from the body such the charging cap is opened.

In addition, when the charging cap is provided in a push-type, the vehicle may change the charging cap from the locked state to the unlocked state in response to determining that the user has a charging intention. In this case, the vehicle may allow the charging cap to be separated from the body in response to an external force applied to the charging cap by the user such that the charging cap is opened.

The vehicle may perform communication with the remote controller to determine whether the user detected by the obstacle detector is the owner of the vehicle in response to determining that the user has a charging intention.

In the communicating with the remote controller, the vehicle may determine whether the remote controller is located outside the vehicle, and in response to determining that the remote controller is located outside the vehicle and an authentication signal received from the remote controller is a previously stored authentication signal, may open the charging cap.

The vehicle identifies the charging state of the battery (307) to determine whether the charging is completed (308).

The identifying of the charging state of the battery may include identifying the current, voltage and temperature of the battery, and identifying the charged amount of the battery corresponding to the identified current, voltage, and temperature of the battery.

The identifying of the charging state of the battery may include identifying the charging time of the battery and may include identifying the charging cost of the battery.

The determining of whether the charging of the battery is completed may include determining whether the connector of the charging cable is disconnected from the charging port of the charging unit.

The determining of whether the charging of the battery is completed may include determining whether the identified charged amount of the battery is a full-charge amount, and may determining whether the charging time of the battery is a charging time input by the user, and may include determining whether the charging cost of the battery is a cost input by the user.

The vehicle, in response to determining that the charging of the battery is completed, may determine whether the charging cap is open on the basis of the detection signal detected by the opening/closing detector 118 (309), and in response to determining that the charging cap is open, may output notification information notifying the user that the charging cap is open such that the user recognizes the opening of the charging cap and thus closes the charging cap (310).

The outputting of the notification information for notifying the opening of the charging cap may include displaying the notification information for notifying the opening of the charging cap through the display in the form of an image, or outputting the notification information for notifying the opening of the charging cap through the sound output unit in the form of a guidance speech, a warning sound or a melody.

In a case that an actuator for automatically closing the charging cap is provided in the vehicle, the vehicle may automatically close the charging cap in response determining that the charging of the battery is completed. In this case, the vehicle may change the charging cap to the locked state.

As described above, the present embodiment may determine the charging intention of the user and automatically open the charging cap, thereby removing a hassle to open the door and manipulate the switch when the user alights from the vehicle without turning on the switch for opening the charging cap.

Although the present embodiment has been described in relation to a vehicle chargeable at a charging station, the present disclosure may be applied to an internal combustion engine vehicle that travels on fuel. The internal combustion engine vehicle may include a fuel tank, and may include a refueling unit having a refueling port and a refueling cap.

Here, the refueling port represents a replenishing port for replenishing a fuel that is an energy source, and into which a replenishing port into which the refueling gun is inserted.

The internal combustion engine vehicle may store a refueling path for determining the refueling intention of the user. Here, the refueling path may represent a path for replenishing an energy source.

In addition, the charging intention or the refueling intention of the user may represent the replenishing intention of the user to replenish an energy source.

A vehicle according to another embodiment may automatically open the refueling cap according to the refueling intention of the user when the refueling is performed by a refueling staff.

This will be described with reference to FIG. 6.

Figure 6:
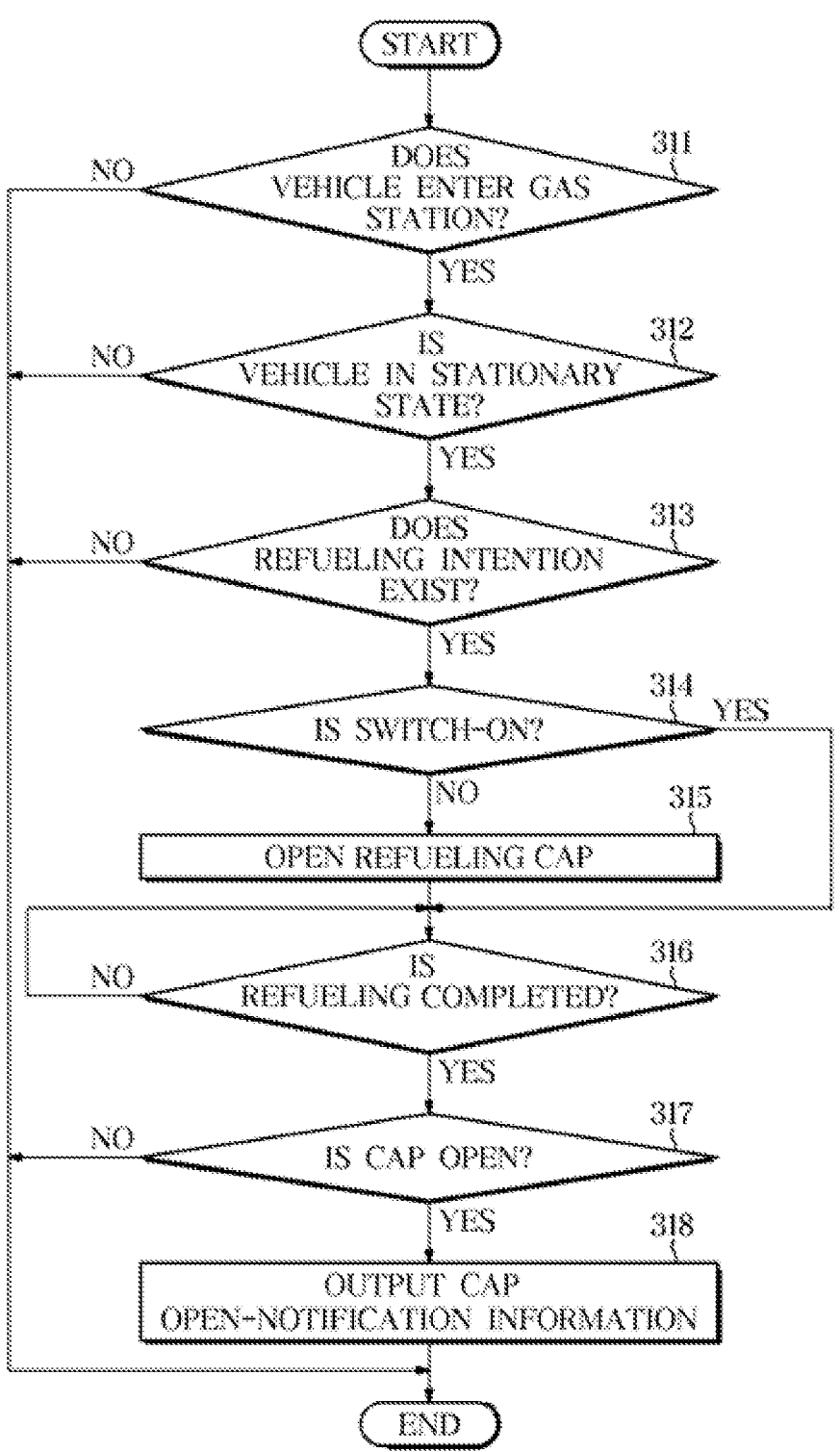
FIG. 6 is a flowchart showing a method of controlling a vehicle according to another embodiment.

FIG. 6 is a flowchart showing a method of controlling a vehicle according to another embodiment. The vehicle may identify current position information of the vehicle together with map information in navigation information during execution of a navigation mode, and determine whether the vehicle enters a gas station on the basis of the current position information and the map information (311), and in response to determining that the vehicle enters the gas station, may determine whether the vehicle is in a stationary state (312).

Here, the determining of whether the vehicle is in a stationary state may include identifying the travel speed of the vehicle and determining whether the identified travel speed of the vehicle is zero.

The determining of whether the vehicle is in a stationary state may include determining that the vehicle is in a stationary state when it is determined that the ignition of the vehicle is turned off.

The determining of whether the vehicle is in a stationary state may include determining that the vehicle is in a stationary state when it is determined that the driver alights from the vehicle.

In addition, the vehicle, during non-execution of a navigation mode, may determine whether the current position corresponds to a gas station on the basis of current position information. In this case, map information may be stored in the vehicle, and position information of the gas station may be stored in the vehicle.

The vehicle, in response to determining that the vehicle is in a stationary state, may determine whether the user has a refueling intention (313). In this case, the vehicle may determine whether an obstacle is detected through the obstacle detector provided adjacent to the refueling cap, and in response to determining that the obstacle is detected, may identify a distance to the detected obstacle, and in response to the identified distance being within a predetermined distance, may determine that the user has a refueling intention.

Identification information of the obstacle detector provided adjacent to the refueling cap may be stored in the vehicle.

Here, the determining that the user has a refueling intention may include determining that the user or a refueling staff exists around the refueling cap to perform refueling.

The vehicle, in response to determining that the user has a refueling intention, may determine whether an on-signal for opening the cap is received from the switch, which is a cap-input (314), and in response to determining that the on-signal is not received from the switch, may open the refueling cap (315).

The vehicle, in response to determining that the on-signal is received from the switch, may not perform the automatic cap opening by determining that the refueling cap is opened by the user.

The vehicle may determine whether the on-signal for opening the cap is received from the switch, which is a cap input, in a state in which the user alights from the vehicle, and in response to determining that the on-signal is not received from the switch, may determine whether an obstacle is detected by the obstacle detector around the refueling cap to determine the refueling intention of the user, and in response to determining that the obstacle is determined, may identify the distance to the obstacle, and in response to determining that the identified distance is within a predetermined distance, may determine that the user has a refueling intention.

In the opening of the refueling cap, the vehicle may change the refueling cap from the locked state to the unlocked state and allow the unlocked refueling cap to be separated from the body such that the refueling cap is opened.

In addition, when the refueling cap is provided in a push-type, the vehicle may change the refueling cap from the locked state to the unlocked state in response to determining that the user has a refueling intention. In this case, the vehicle may allow the refueling cap to be separated from the body in response to an external force applied to the refueling by the user cap such that the charging cap is opened.

The vehicle may identify the amount of fuel in a fuel tank and may determine whether the refueling is completed on the basis of a change in the identified amount of fuel (316). In other words, the vehicle may determine that the refueling is completed when the amount of fuel does not change.

The vehicle may determine whether a refueling gun exists through a sensor provided in the refueling port, and in response to determining that the refueling gun does not exist in the refueling port, may determine that the refueling is completed.

The vehicle, in response to determining that the refueling is completed, may determine whether the refueling cap is open on the basis of the detection signal detected by the opening/closing detector 118 (317), and in response to determining that the refueling cap is open, may output notification information notifying the user that the refueling cap is open such that the user recognizes the open state of the refueling cap and closes the refueling cap (318).

Here, the outputting of the notification information for notifying the opening of the refueling cap may include displaying the notification information for notifying the opening of the refueling cap through the display in the form of an image, or outputting the notification information for notifying the opening of the refueling cap through the sound output unit in the form of a guidance speech, a warning sound or a melody.

In a case that an actuator for automatically closing the refueling cap is provided in the vehicle, the vehicle may automatically close the refueling cap in response determining that the refueling is completed. In this case, the vehicle may change the refueling cap to the locked state.

As described above, the present embodiment may determine the refueling intention of the user and automatically open the refueling cap, thereby removing a hassle to open the door and manipulate the switch when the user alights from the vehicle without turning on the switch for opening the refueling cap.

FIG. 7 is a control block diagram illustrating a vehicle according to another embodiment.

The vehicle includes the opening/closing detector 118, the alighting detector 119, the input 120, a controller 132, a storage 133, the output unit 140, the driving unit 150, the communication device 160, and an image acquisition unit 170.

In the following description, details of parts identical to those of the previous embodiment, such as the opening/closing detector 118, the alighting detector 119, the input 120, the output unit 140, the driving unit 150, and the communication device 160, will be omitted.

The image acquisition unit 170 acquires an image of a surrounding of the charging unit 117 and transmits the acquired image to the controller 132.

The image acquisition unit 170 may be a camera, including a charge-coupled device (CCD) or complementary metal-oxide semiconductor (CMOS) image sensor, or a three-dimensional (3D) spatial recognition sensor, such as a KINECT (RGB-D sensor), a time of flight (TOF) camera (Structured Light Sensor), a stereo camera, and the like.

When the charging unit is provided on the front panel, the image acquisition unit 170 may be a camera for acquiring an image of a road ahead of the vehicle, such as a black box camera and an autonomous driving-purpose camera.

The image acquisition unit 170 may be provided on the front window glass inside the vehicle to photograph the outside of the vehicle, may be provided on a room mirror inside the vehicle to photograph the outside of the vehicle, or may be provided on the roof panel to be exposed to the outside.

In a case that the charging unit is provided on the rear panel, the image acquisition unit 170 may be a camera for acquiring a rear view image of the vehicle, such as a rear side camera. The image acquisition unit 170 may be provided on the tailgate, the rear window glass, or the roof panel.

In a case that the charging unit is provided on the left fender panel, the image acquisition unit 170 may be a left side camera for acquiring the image on the left side of the vehicle.

In a case that the charging unit is provided on the right fender panel, the image acquisition unit 170 may be a right side camera for acquiring the image on the right side of the vehicle.

Referring to FIG. 8, the image acquisition unit 170 may be provided on the charging cap 117*a*.

The controller 132 determines the charging intention of the user, and in response to determining that the user has a charging intention, controls the driving unit 150 to automatically open the charging cap 117*a*.

In the determining of the charging intention of the user, the controller 132 may determine whether a charging gun exists among objects in the image acquired by the image acquiring unit 170 and in response to determining that the image of the charging gun exists, determine that the user has a charging intention and control the driving unit 150 to automatically open the charging cap 117*a*.

The controller 132 may recognize a face among the objects in the image acquired by the image acquisition unit 170, determine whether the recognized face is the face of the user, and in response to determining that the recognized face is the face of the user, may determine that the user has a charging intention.

The controller 132 may recognize a face and a charging gun among the objects in the image acquired by the image acquisition unit 170, determine whether the recognized face is the face of the user, and in response to determining that the recognized face is the face of the user and that the charging gun is recognized, may determine that the user has a charging intention.

That is, in order to determine the charging intention of the user, the controller 132 determines whether the image acquired by the image acquisition unit 170 is an image in which the user grips the charging gun.

In the controlling of the driving unit 150 to automatically open the charging cap 117*a*, the controller 132 may change the charging cap 117*a* locked with the connection member 117*d* into an unlocked state.

In the changing of the charging cap 117*a* from the locked state to the unlocked state, the controller 132 may allow the charging cap 117*a* to be separated from the connection member 117*d*.

In the changing of the charging cap 117*a* from the locked state to the unlocked state, the controller 132 may release the locking of the charging cap 117*a* while keeping the charging cap 117*a* connected to the connection member 117*d*. In this case, the user may open the charging cap 117*a* by applying an external force to the charging cap 117*a*. In addition, when the charging is completed, the user may close the charging cap 117*a* by applying an external force to the charging cap 117*a*. That is, the charging cap 117*a* may be provided in a push-type.

In a case that the vehicle only has an opening and closing device for opening and closing the charging cap without having no separate locking device for locking the charging cap, the controller 132 may allow the charging cap 117*a* to be separated from the connection member 117*d* in the controlling of the driving unit 150 to automatically open the charging cap 117*a*.

In a case that the vehicle is provided with a cap input, the controller 132, in response to determining that the user has a charging intention, may determine whether a cap-opening signal is received from the cap input. The controller 130, in response to determining that the cap-opening signal is not received, may control the driving unit 150 to automatically open the charging cap 117*a*, and in response to determining that the cap-opening signal is received, may not perform the automatic opening.

The controller 132, in response to determining that the ignition is turned off, may supply power to the image acquisition unit and the driving unit for a preset period of time from the time when the ignition of the vehicle is turned off to determine the charging intention of the user.

The controller 132, in response to determining the user has alighted from the vehicle, may determine whether a cap-opening signal is received from the cap input, and in response to determining that the cap opening signal is not received from the cap input, may determine whether the user has a charging intention on the basis of the image acquired by the image acquisition unit, and in response to determining that the cap opening signal is received from the cap input, may omit the determination of the charging intention of the user.

The controller 132 may monitor the charging state of the battery to determine whether the charging of the battery is completed, and in response to determining that the charging is completed, determine whether the charging cap is open, and in response to determining that the charging cap is open, control the operation of an output unit 140 such that open-charging cap notification information is output through the output unit 140.

The controller 132 may determine a charging completion intention of the user that the user separates the connector of the charging cable from the charging port on the basis of the plurality of images acquired by the image acquisition unit.

The controller 132 may determine that the charging is completed in response to determining that the connector of the charging cable is separated from the charging port or that the charging state of the battery is in a full-state.

The controller 132 may determine that the charging is completed in response to determining that the charging time of the battery is the time desired by the user or the charging cost is the amount of money provided by the user.

The controller 132 may determine the boarding state of the user on the basis of the detection signal detected by the alighting detector. In this case, the controller 132, in response to determining that the user has boarded the vehicle, may monitor the charging state of the battery to determine whether the charging of the battery is completed, and in response to determining the charging is completed, determine whether the charging cap is open, and in response to determining that the charging cap is open, control the operation of the output unit 140 such that open-charging cap notification information is output through the output unit 140.

The controller 132, in response to determining that the vehicle is in a stationary state, may activate the image acquisition unit to acquire an image of the surrounding of the charging cap and determine whether the user has a charging intention on the basis of the image acquired by the image acquisition.

The storage 133 may store image information about the face of the user and image information about the charging gun.

The storage 133 may store information about feature points extracted from the facial image of the user and information about feature points extracted from the image of the charging gun.

The vehicle may further include the communication device 160 for performing communication with the remote controller 200.

The controller 132 may further include determining that the user has a charging intention in response to determining that communication with the remote controller 200 outside the vehicle is performable.

The communication device 160 may further include a position receiver.

In this case, the controller 132 may determine whether the vehicle is located at a charging station on the basis of current position information and map information, and in response to determining that the vehicle is located at the charging station, may control activation of the image acquisition unit installed around the charging cap.

Although the present embodiment has been described in relation to a rechargeable vehicle, the present disclosure may also be applied to a vehicle that replenishes a fuel as an energy source.

FIG. 9 is a flowchart showing a method of controlling a vehicle according to another embodiment.

The vehicle may determine whether the vehicle is in a stationary state (321), and in response to determining that the vehicle is in a stationary state, may activate the image acquisition unit to acquire an image of the surrounding of the charging cap (322).

Here, the determining of whether the vehicle is in a stationary state may include determining whether the travel speed of the vehicle is zero.

The determining of whether the vehicle is in a stationary state may include determining whether the ignition of the vehicle is turned off.

The determining of whether the vehicle is in a stationary state may include determining whether the driver alights from the vehicle.

In addition, the vehicle, in response to determining that the ignition is turned off, may supply power to the image acquisition unit, the driving unit, and the communication device for a preset period of time from the time when the ignition of the vehicle is turned off to determine the charging intention of the user.

The vehicle determines the charging intention of the user on the basis of the acquired image (323).

That is, the vehicle may determine whether the user has a charging intention by recognizing objects in the acquired image and determining whether a charging gun exists among the objects.

In addition, the vehicle may recognize objects in the acquired image, recognize a face among the objects, determine whether the recognized face is the face of the user, and in response to determining that the recognized face is the face of the user, and determine whether a charging gun exists in the recognized objects, to thereby determine whether the user has a charging intention.

The vehicle may determine whether the vehicle is located at a charging station on the basis of current position information and map information, and in response to determining that the vehicle is located at the charging station, control activation of the image acquisition unit. Then, the vehicle may determine whether a charging gun exists in objects in an image acquired by the image acquisition unit to determine whether the user has a charging intention.

The vehicle, in response to determining that the user has a charging intention, may determine whether an on-signal for opening the cap is received from the switch, which is a cap input (324), and in response to determining that the on-signal is not received, may open the charging cap 117*a* (325).

The vehicle, in response to determining that the on-signal is received, may not perform the cap opening by determining that the charging cap 117*a* is opened by the user.

The vehicle may determine whether the on-signal for opening the cap is received from the switch, which is a cap input, in a state in which the user alights from the vehicle, and in response to determining that the on-signal is not received from the switch, may acquire an image of the surrounding of the charging cap to determine the charging intention of the user.

The vehicle, in response to determining that the on-signal is received from the switch, may omit the determination of the charging intention of the user. That is, the vehicle may inactivate the operation of the image acquisition unit for acquiring the image of the surrounding of the charging cap.

In a case that the vehicle is not provided with the switch, which is a cap input, the vehicle may automatically open the charging cap 117*a* without needing to determine a switch-on manipulation when it is determined that the user has a charging intention.

In the opening of the charging cap, the vehicle may change the charging cap from a locked state to an unlocked state, and allow the unlocked charging cap to be separated from the body such that the charging cap is opened.

In addition, when the charging cap is provided in a push-type, the vehicle may change the charging cap from the locked state to the unlocked state in response to determining that the user has a charging intention. In this case, the vehicle may allow the charging cap to be separated from the body in response to an external force applied to the charging cap by the user such that the charging cap is opened.

The vehicle, in response to determining that the user has a charging intention, performs communication with the remote controller without needing to perform face recognition.

That is, in the communicating with the remote controller, the vehicle may determine whether the remote controller is located outside the vehicle, and in response to determining that the remote controller is located outside the vehicle and an authentication signal received from the remote controller is a previously stored authentication signal, may open the charging cap.

The vehicle identifies the charging state of the battery (326) to determine whether the charging is completed (327).

The vehicle, in response to determining that the charging of the battery is completed, may determine whether the charging cap is open on the basis of the detection signal detected by the opening/closing detector 118 (328), and in response to determining that the charging cap is open, may output notification information notifying the user that the charging cap is open (329) such that the user recognizes the open state of the charging cap and closes the charging cap.

The outputting of the notification information for notifying the opening of the charging cap may include displaying the notification information for notifying the opening of the charging cap through the display in the form of an image, or outputting the notification information for notifying the opening of the charging cap through the sound output unit in the form of a guidance speech, a warning sound or a melody.

In a case that an actuator for automatically closing the charging cap is provided in the vehicle, the vehicle may automatically close the charging cap in response determining that the charging of the battery is completed. In this case, the vehicle may change the charging cap to the locked state.

As described above, the present embodiment may determine the charging intention of the user and automatically open the charging cap, thereby removing a hassle to open the door and manipulate the switch when the user alights from the vehicle without turning on the switch for opening the charging cap.

Although the present embodiment has been described in relation to a vehicle chargeable at a charging station, the present disclosure may be applied to an internal combustion engine vehicle that travels on fuel. The internal combustion engine vehicle may include a fuel tank, and may include a refueling unit having a refueling port and a refueling cap.

The present embodiment has been described in relation to an example in which an energy source is replenished by a user or a refueling staff. However, in a case that automatic charging or automatic refueling is performable according to autonomous drive, the vehicle may automatically open the cap in response to automatically recognizing a moving charging gun or refueling gun through image recognition.

FIG. 10 is a control block diagram illustrating a vehicle according to another embodiment.

The vehicle includes the obstacle detector 116, the opening/closing detector 118, the alighting detector 119, the input 120, a controller 134, a storage 135, the output unit 140, the driving unit 150, the communication device 160, and the image acquisition unit 170.

In the following description, details of parts identical to those of the previous embodiment, such as the obstacle detector 116, the opening/closing detector 118, the alighting detector 119, the input 120, the output unit 140, the driving unit 150, and the communication device 160, will be omitted.

In the following description, details of the image acquisition unit 170 identical to that of the previous embodiment shown in FIG. 8 will be omitted.

In the following description, details of the storage 135 identical to the storage 131 and the storage 133 of the previous embodiments will be omitted.

The controller 134 determines the charging intention of the user and controls the driving unit 150 to automatically open the charging cap 117*a* in response to determining that the user has a charging intention.

In the determining of the charging intention of the user, the controller 134 may acquire the position of the user on the basis of the detection signal output from the obstacle detector 116, determine whether the position of the user is adjacent to the charging cap 117*a*, and in response to determining that the position of the user is adjacent to the charging cap 117*a*, control the driving unit 150 to automatically open the charging cap 117*a*.

When it is determined that the user is located within a predetermined distance from the charging cap 117*a* in the determining of whether the user is adjacent to the charging cap 117*a*, the controller 134 may determine that the position of the user is adjacent to the charging cap 117*a*.

In the determining of the charging intention of the user, the controller 134 may identify a time for which the position of the user remains within a predetermined distance to the charging cap, and in response to the identified time determined to be longer than or equal to a predetermined time, may determine that the user has a charging intention.

In a case that the vehicle is provided with a plurality of obstacle detectors, the controller 134 may acquire the position of the user on the basis of detection signals detected by the plurality of obstacle detectors.

In this case, the controller 134 may acquire a change in position of the user on the basis of the reception order of the detection signals detected by the plurality of obstacle detectors.

That is, the controller 134, in response to receiving detection signals of detecting an obstacle which are output from the plurality of obstacle detectors, may acquire the reception order of the detection signals on the basis of the reception time at which the detection signal is received, may acquire the installation positions of the obstacle detectors having output the detection signals of the obstacle on the basis of the acquired reception order, may acquire a change in position of the user from the installation positions of the obstacle detectors corresponding to the reception order of the detection signals, may compare a movement path of the user corresponding to the acquired change in position of the user with a charging path stored in the storage 135, may determine whether a charging gun exists among objects in an image acquired by the image acquisition unit 170 when the acquired movement path of the user coincides with the charging path, may determine that the user has a charging intention in response to determining that the image of the charging gun exists and thus may control the driving unit 150 such that the charging cap 117*a* is automatically opened.

The controller 134 may acquire the distances of each of the plurality of obstacle detectors to the user on the basis of the detection signals detected by the plurality of obstacle detectors, and may acquire the movement path of the user on the basis of the installation position of an obstacle detector having output a detection signal associated with a distance among the acquired distances that is less than a predetermined distance.

The controller 134 may recognize a face among the objects in the image acquired by the image acquisition unit 170, determine whether the recognized face is the face of the user, and in response to determining that the recognized face is the face of the user, may determine that the user has a charging intention.

The controller 134 may identify a distance to an obstacle detected through the obstacle detector provided adjacent to the charging cap, and may recognize a charging gun in an image acquired through the image acquisition unit in response to the distance less than or equal to a predetermined distance, to thereby determine whether the user has a charging intention.

The configuration of the controller 134 for controlling the driving unit 150 to automatically open the charging cap 117*a* is identical to that of the previous embodiment, and thus detailed description thereof will be omitted.

Although the present embodiment has been described in relation to a vehicle that charges electricity as an energy source, the present disclosure may also be applied to a vehicle that replenishes a fuel as an energy source.

A method of controlling the vehicle according to the present embodiment described with reference to FIG. 10 may be implemented by a combination of the vehicle control methods shown in FIGS. 5 and 9, and thus description thereof will be omitted.

FIG. 11 is a control block diagram illustrating a vehicle according to another embodiment.

The vehicle according to the embodiment includes the input 120, a controller 136, a storage 137, the output unit 140, the driving unit 150, and a communication device 160.

Although not shown in FIG. 11, the vehicle according to the embodiment may further include the opening/closing detector 118 and the alighting detector 119.

In the following description, details of parts identical to those of the previous embodiments, such as the opening/closing detector 118, the alighting detector 119, the input 120, and the output unit 140, and the driving unit 150 will be omitted.

The communication device 161 performs wireless communication with a charging gun provided at a charging station provided at a charging station or a refueling gun provided at a gas station.

Here, a radio frequency (RF) communication module 300 may be provided in the charging gun, or may be provided in the refueling gun. Accordingly, the charging gun of the charging station or the refueling gun of the gas station may perform communication with the vehicle.

The communication device 161 may include a RF communication module.

That is, the communication device 161 may transmit identification information of the vehicle and may receive identification information of the charging gun or the refueling gun through the RF communication.

The communication device 161 may also perform wireless communication with a terminal provided in a charging station or a gas station.

The communication device 161 may receive a charging command or a refueling command on the basis of the identification information received from the vehicle.

That is, the communication device 161 may transmit the charging cost or the charging time desired by the user through the RF communication, and may transmit the refueling cost or the refueling amount desired by the user through the RF communication.

The communication device 161 may include one or more components that enable communication with an external device, and may include at least one of a short-range communication module and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The controller 136 determines the charging intention of the user and controls the driving unit 150 to automatically open the charging cap 117a in response to determining that the user has a charging intention.

In the determining of the charging intention of the user, the controller 136 determines that the user has a charging intention in response to receiving a RF signal of the charging gun or the refueling gun through the communication device 161, and controls the driving unit 140 to automatically open the charging cap 117a.

The controller 136 may transmit an energy source replenishment command and energy source replenishment information through the communication device 161.

The configuration of the controller 136 for controlling the driving unit 150 to automatically open the charging cap 117a is identical to that of the previous embodiment, and thus description thereof is omitted.

In a case that the vehicle is provided with a cap input, the controller, in response to determining that the user has a charging intention, may determine whether a cap-opening signal is received from the cap input. The controller 136, in response to determining that the cap-opening signal is not received from the cap input, may control the driving unit 150 to automatically open the charging cap 117a, and in response to determining that the cap-opening signal is received, may not allow communication between the communication device and the charging gun.

In addition, the controller 136, in response to determining that the ignition of the vehicle is turned off, may supply power to the communication device and the driving unit for a preset period of time from the time when the ignition of the vehicle is turned off to determine the charging intention of the user.

The controller 136, in response to determining the user has alighted the vehicle, may determine whether a cap-opening signal is received from the cap input, and in response to determining that the cap opening signal is not received from the cap input, may determine the charging intention of the user on the basis of communication information of the communication device, and in response to determining that the cap opening signal is received from the cap input, may omit the determination of the charging intention of the user.

The controller 136, in response to determining that the vehicle is in a stationary state, may activate the communication acquisition unit to perform communication with the charging gun.

The storage 137 may store the identification information of the vehicle, the identification information of the charging gun, and the identification information of the refueling gun.

FIG. 12 is a flowchart showing a method of controlling a vehicle according to another embodiment.

The vehicle determines whether the vehicle is in a stationary state, and in response to determining that the vehicle is in a stationary state, activates the operation of the communication device to determine whether a RF signal of the charging gun is received (331).

Here, the determining of whether the vehicle is in a stationary state may include determining whether the travel speed of the vehicle is zero.

The determining of whether the vehicle is in a stationary state may include determining whether the ignition of the vehicle is turned off.

The determining of whether the vehicle is in a stationary state may include determining whether the driver alights from the vehicle.

In addition, the vehicle, in response to determining that the ignition is turned off, may supply power to the driving unit and he communication device for a preset period of time from the time when the ignition of the vehicle is turned off to determine the charging intention of the user.

The vehicle may determine whether the vehicle is located at a charging station on the basis of current position information and map information, and in response to determining that the vehicle is located at the charging station, may control activation of the communication device. Then, the vehicle opens the charging cap in response to receiving a RF signal of the charging gun through the communication device (332).

The vehicle, in response to determining that an on-signal is received from the switch, may not perform the automatic opening by determining that the charging cap 117a is opened by the user.

The vehicle may determine whether the on-signal for opening the cap is received from the switch, which is a cap input, in a state in which the user alights from the vehicle, and in response to determining that the on-signal is not received from the switch, may perform communication with the charging gun to determine the charging intention of the user.

The vehicle, in response to determining that the on-signal is received from the switch in a state in which the user alights from the vehicle, may omit the determination of the charging intention of the user. That is, the vehicle may inactivate the communication operation of the communication device.

In the opening of the charging cap, the vehicle may change the charging cap from a locked state to an unlocked state, and allow the unlocked charging cap to be separated from the body such that the charging cap is opened.

In addition, when the charging cap is provided in a push-type, the vehicle may change the charging cap from the locked state to the unlocked state in response to determining that the user has a charging intention. In this case, the vehicle may allow the charging cap to be separated from the body in response to an external force applied to the charging cap by the user such that the charging cap is opened.

The vehicle identifies the charging state of the battery (333) to determine whether the charging is completed (334), and in response to determining that the charging is completed, automatically closes the charging cap (335).

In a case that an actuator for automatically closing the charging cap is not provided in the vehicle, the vehicle may determine whether the charging cap is open on the basis of the detection signal detected by the opening/closing detector 118 in response to determining that the charging of the battery is completed, and may output notification information notifying the user that the charging cap is open in response to determining that the charging cap is open such that the user recognizes the opening of the charging cap and closes the charging cap.

The outputting of the notification information for notifying the opening of the charging cap may include displaying the notification information for notifying the opening of the charging cap through the display in the form of an image, or outputting the notification information for notifying the opening of the charging cap through the sound output unit in the form of a guidance speech, a warning sound or a melody.

As described above, the present embodiment may determine the charging intention of the user and automatically open the charging cap, thereby removing a hassle to open the door and manipulate the switch when the user alights from the vehicle without turning on the switch for opening the charging cap.

Although the present embodiment has been described in relation to a vehicle chargeable at a charging station, the present disclosure may be applied to an internal combustion engine vehicle that travels on fuel. The internal combustion engine vehicle may include a fuel tank, and may include a refueling unit having a refueling port and a refueling cap.

The present embodiment has been described in relation to an example in which an energy source is replenished by a user or a refueling staff, but in a case that automatic charging or automatic refueling is performable according to autonomous driving, the vehicle may automatically open the cap in response to automatically recognizing a moving charging gun or refueling gun through image recognition and performing RF communication with the charging gun or the refueling gun.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, when the driver alights the vehicle without manipulating the switch in a situation in which charging/refueling is required, the present disclosure allows a cap of a charging/refueling port to be automatically unlocked and opened to thereby remove the hassle of the driver in moving to the driver's seat, opening the door of the driver's seat, and manipulating the switch, so that the convenience of use can be improved.

According to the present disclosure, when the user broads the vehicle without closing the cap after the refueling or charge is completed, open-cap notification information is output such that the user recognizes the open state of the cap and closes the cap, so that the safety can be improved.

In addition, the present disclosure allows the cap to be automatically closed when the driver boards the vehicle without closing the cap after the refueling or charging is completed, thereby improving the convenience of the user, preventing impurities or moisture from being introduced into the charging/refueling port, and preventing a malfunction caused by the impurities or moisture.

The present disclosure can implement autonomous charging or refueling when the vehicle enters a charging station or a gas station, thereby improving the convenience of the user.

As described above, the present disclosure can improve the quality and merchantability of the vehicle, increase the satisfaction of the user, improve the convenience of the user and the safety of the vehicle, and secure the competitiveness of the product.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A vehicle comprising:

an image acquisition unit;

a storage configured to store an energy source replenishment path and facial information of an authorized user;

a plurality of obstacle detectors provided at different positions on a body and configured to detect an obstacle;

a cap provided on a body of the vehicle and configured to open and close a replenishing port for replenishing an energy source;

a driving unit allowing the cap to be separated or connected from/to the body; and a controller configured to:

identify identification information of obstacle detectors that have outputted a detection signal and a detection order thereof;

determine a movement path of the user based on the identified identification information and the detection order;

activate the image acquisition unit in response to determining that the determined movement path coincides with the energy source replenishment path stored in the storage; and determine that an intention of the user to replenish the energy source exists in response to determining that a face recognized from an image acquired by the activated image acquisition unit corresponds to the facial information of the authorized user stored in the storage.

2. The vehicle of claim 1, further comprising:

a storage configured to sequentially store pieces of identification information of the obstacle detectors corresponding to an energy source replenishment path; and an alighting detector configured to determine whether the user alights from the vehicle, wherein the controller is configured to determine whether the user alights from the vehicle on the basis of a detection signal detected by the alighting detection signal, identify identification information of the at least one obstacle detector among the plurality of obstacle detectors and an detection order of the obstacle in response to determining that the user alights from the vehicle, determine a movement path of the user on the basis of the identified identification information of the at least one obstacle detector and the identified detection order, and activate the image acquisition unit when the movement path coincides with the energy source replenishment path.

3. The vehicle of claim 2, wherein the controller is further configured to acquire a distance to the obstacle on the basis of a detection signal detected by the at least one obstacle detector, and determines that the intention of the user to replenish the energy source exists when the acquired distance to the obstacle is less than or equal to a predetermined distance.

4. The vehicle of claim 3, wherein the controller is further configured to determine that the intention of the user to replenish the energy source exists when a time for which the acquired distance to the obstacle remains less than or equal to the predetermined distance is longer than or equal to a predetermined time.

5. The vehicle of claim 1, further comprising a communication device configured to perform communication with a remote controller, wherein the controller is configured to determine whether the remote controller in remote communication is located outside the body, and determine that the intention of the user to replenish the energy source exists in response to determining that the remote controller is located outside the body.

6. The vehicle of claim 1, wherein the controller is further configured to control the driving unit such that the cap is automatically closed in response to determining that the replenishment of the energy source is completed.

7. The vehicle of claim 1, further comprising an output unit, wherein the controller, in response to determining that the replenishment of the energy source is completed, is configured to determine whether the cap is open, and in response to determining that the cap is open, control the output unit to output open-cap notification information through the output unit.

8. The vehicle of claim 1, further comprising:

a speed detector configured to detect a travel speed; and a cap input configured to receive a command for opening the cap, wherein the controller is configured to determine whether the vehicle is in a stationary state on the basis of the detected travel speed, and in response to determining that the vehicle is in a stationary state, determine whether the command for opening the cap is received, and in response to determining that the command for opening the cap is not received, identify a detection signal of the plurality of obstacle detectors to determine whether the intention of the user to replenish the energy source exists.

9. The vehicle of claim 1, further comprising:

a position receiver configured to receive current position information; and a storage configured to store map information, wherein the controller is configured to determine whether a current position is a gas station or a charging station on the basis of the current position information and the map information, and in response to determining that the current position corresponds to the gas station or the charging state, identify a detection signal of the plurality of obstacle detectors to determine whether the intention of the user to replenish the energy source exists.

* * * * *